United States Patent
Park et al.

(10) Patent No.: US 10,606,553 B2
(45) Date of Patent: *Mar. 31, 2020

(54) DISPLAY DEVICE AND METHOD OF OPERATING THE SAME

(71) Applicant: LG ELECTRONICS INC., Seoul (KR)

(72) Inventors: Jongseok Park, Seoul (KR); Sanghyuck Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 490 days.

This patent is subject to a terminal disclaimer.

(21) Appl. No.: 15/387,139

(22) Filed: Dec. 21, 2016

(65) Prior Publication Data
US 2017/0102917 A1 Apr. 13, 2017

Related U.S. Application Data

(63) Continuation of application No. 14/186,176, filed on Feb. 21, 2014, now Pat. No. 9,557,961.

(30) Foreign Application Priority Data

Sep. 5, 2013 (KR) .......................... 10-2013-0106742

(51) Int. Cl.
*G06F 3/0481* (2013.01)
*G06F 3/0482* (2013.01)
(Continued)

(52) U.S. Cl.
CPC ........... *G06F 3/167* (2013.01); *G02B 27/017* (2013.01); *G02B 27/0172* (2013.01);
(Continued)

(58) Field of Classification Search
CPC ....................... G06F 3/011; G06F 2203/04104
See application file for complete search history.

(56) References Cited

U.S. PATENT DOCUMENTS

| | | | | |
|---|---|---|---|---|
| 2005/0102631 A1* | 5/2005 | Andreas | ................... | G06F 9/451 715/772 |
| 2011/0197147 A1* | 8/2011 | Fai | ......................... | G06F 1/1639 715/753 |

(Continued)

FOREIGN PATENT DOCUMENTS

| | | |
|---|---|---|
| CN | 101634930 A | 1/2010 |
| CN | 102455843 A | 5/2012 |

(Continued)

OTHER PUBLICATIONS

Alonzo, "How to Master Your Presentations Using Presenter View in PowerPoint," XP055284988, http://www.howtogeek.com/61390/how-to-master-your-presentations-using-presenter-view-in-powerpoint/, May 16, 2011, 2 pages.

*Primary Examiner* — Rayeez R Chowdhury
(74) *Attorney, Agent, or Firm* — Birch, Stewart, Kolasch & Birch, LLP

(57) ABSTRACT

A wearable electronic device including a wireless communication unit configured to be wirelessly connected to a projector for projecting a stored presentation onto a screen of an external device; a main body configured to be worn by a user; a microphone integrally connected to the main body; a sensing unit configured to detect a bio state of the user wearing the electronic device; a display unit configured to be attached to the main body; and a controller configured to match a voice information input through the microphone with a portion of the stored presentation, and to display a part of the stored presentation that follows the portion of the stored presentation matching the voice information input on the display unit, wherein the controller is further configured (Continued)

to change an output size of the part of the stored presentation that follows the portion of the stored presentation when the bio state indicates the user to be in a tense state.

20 Claims, 24 Drawing Sheets

(51) Int. Cl.
*G06F 3/16* (2006.01)
*G06F 3/01* (2006.01)
*G06F 3/03* (2006.01)
*G02B 27/01* (2006.01)
*H04M 1/725* (2006.01)
*G06F 1/16* (2006.01)
*G06F 3/041* (2006.01)
*G06F 17/21* (2006.01)

(52) U.S. Cl.
CPC ......... *G02B 27/0179* (2013.01); *G06F 3/013* (2013.01); *G06F 3/017* (2013.01); *G06F 3/0304* (2013.01); *G02B 2027/014* (2013.01); *G02B 2027/0138* (2013.01); *G02B 2027/0178* (2013.01); *G02B 2027/0187* (2013.01); *G06F 1/163* (2013.01); *G06F 3/0416* (2013.01); *G06F 17/211* (2013.01); *H04M 1/7253* (2013.01)

(56) References Cited

U.S. PATENT DOCUMENTS

| | | | |
|---|---|---|---|
| 2012/0249416 A1* | 10/2012 | Maciocci | G06F 3/011 345/156 |
| 2013/0007668 A1 | 1/2013 | Liu et al. | |
| 2013/0127980 A1* | 5/2013 | Haddick | G06F 3/013 348/14.08 |

FOREIGN PATENT DOCUMENTS

| | | |
|---|---|---|
| JP | 2002-165156 A | 6/2002 |
| JP | 2008-67218 A | 3/2008 |
| JP | 2010-151997 A | 7/2010 |
| KR | 10-1203921 B1 | 11/2012 |
| KR | 10-2012-0132096 A | 12/2012 |
| WO | WO 2013/057658 A1 | 4/2013 |

* cited by examiner

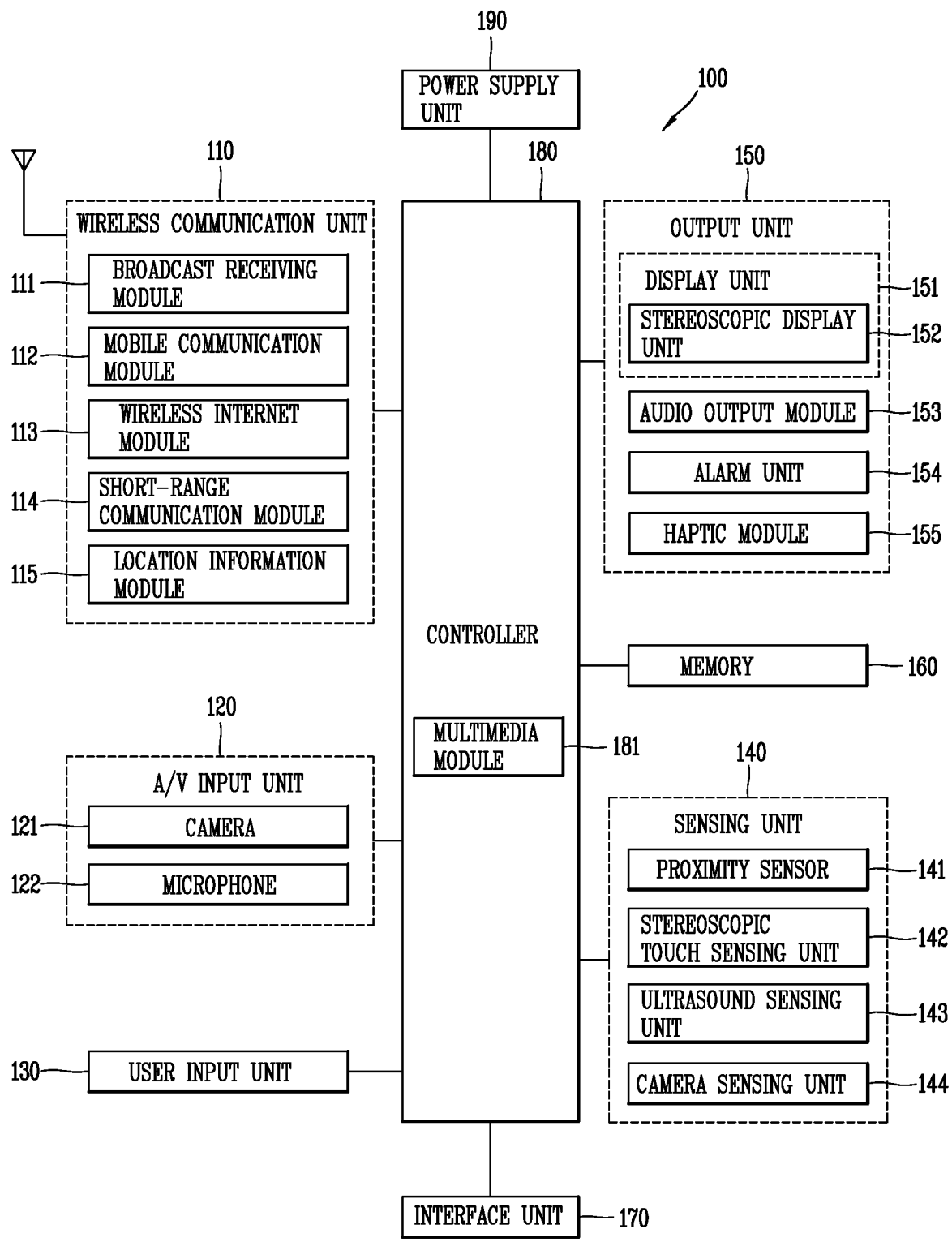

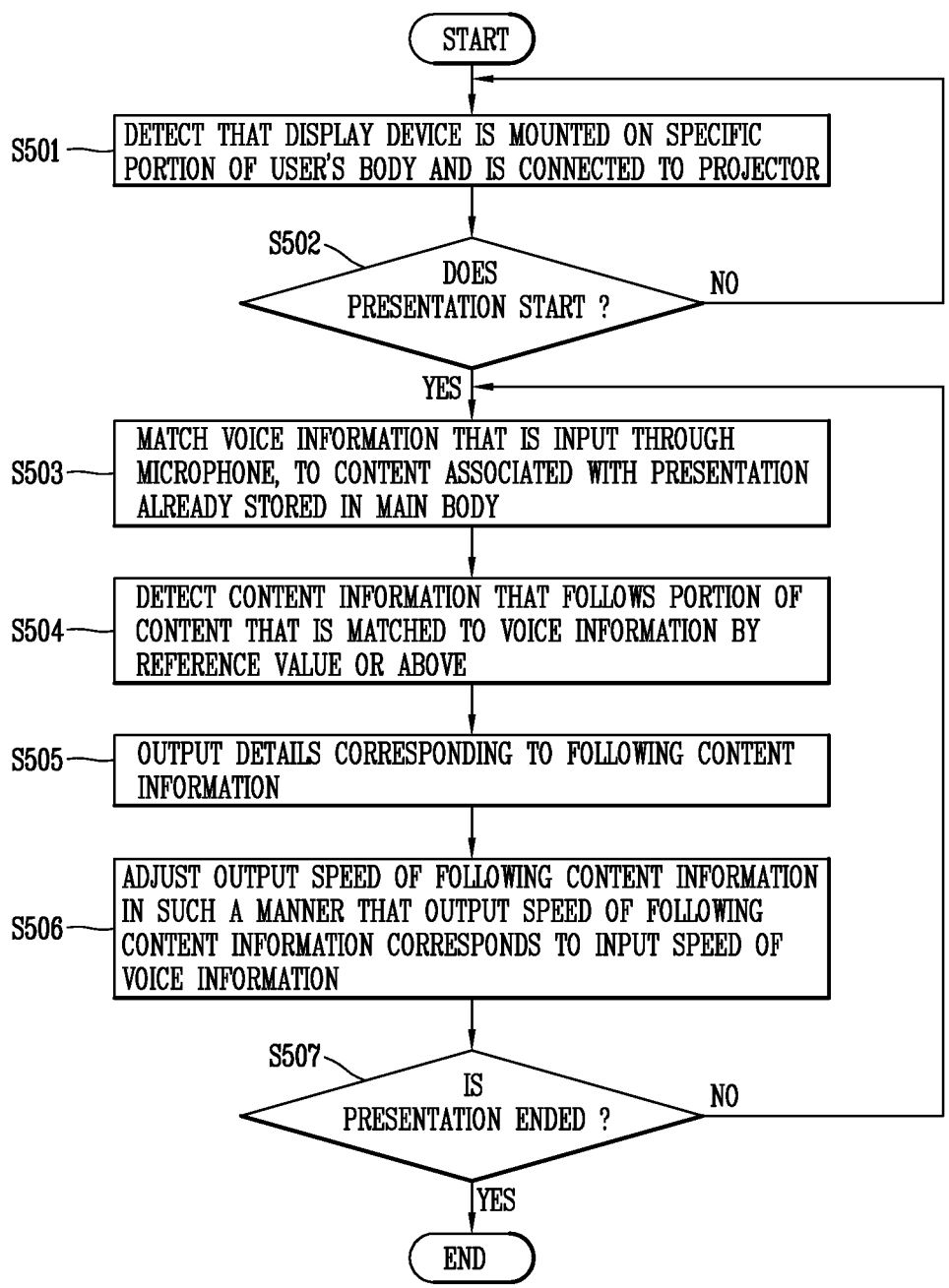

FIG. 7C
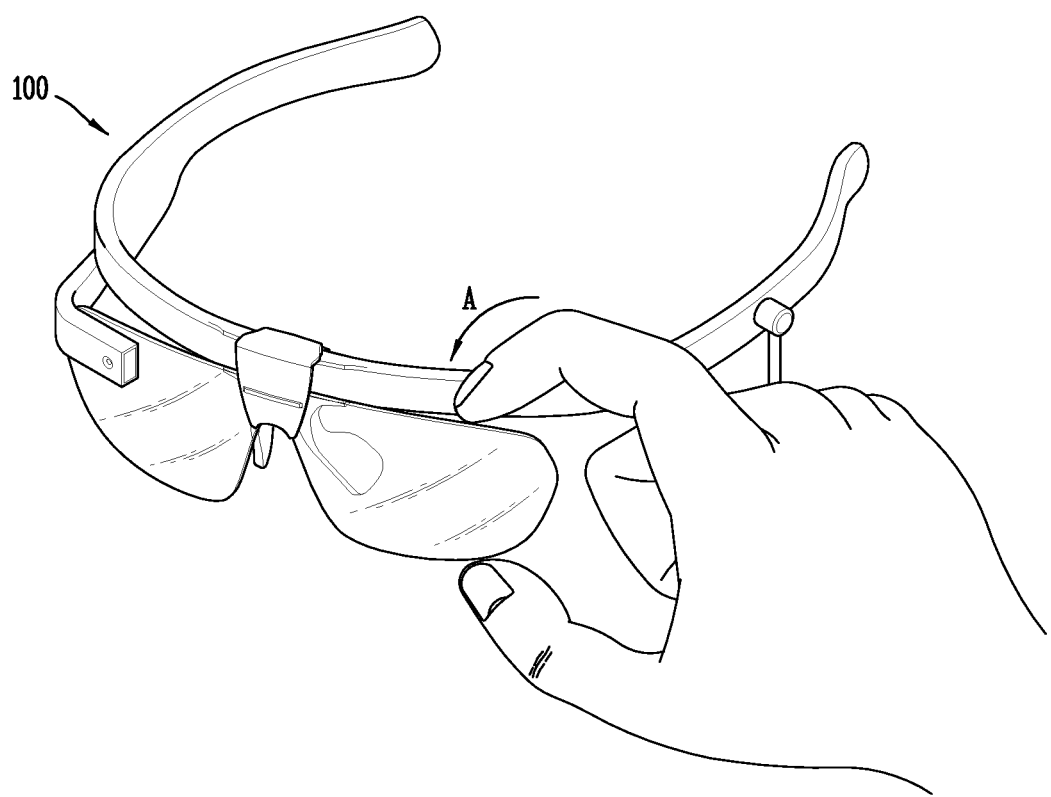
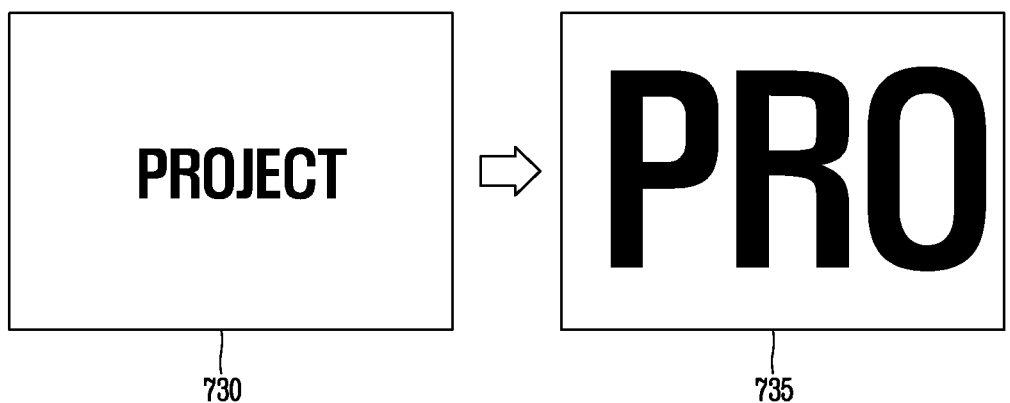

FIG. 7D
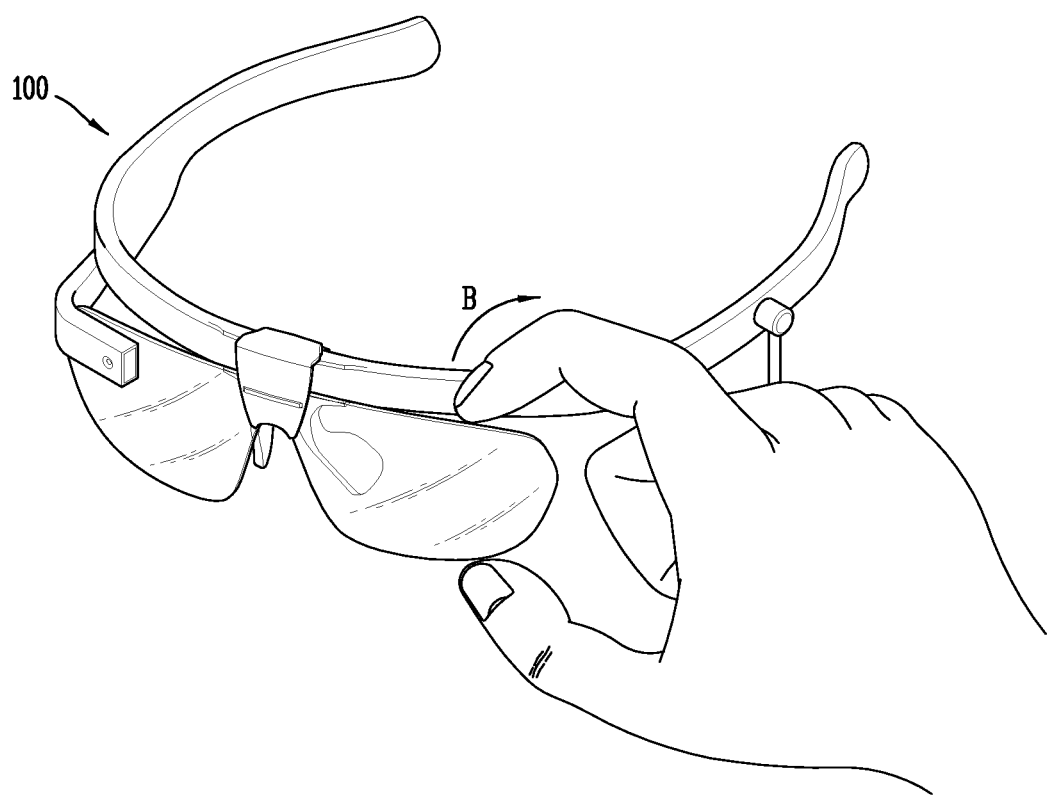
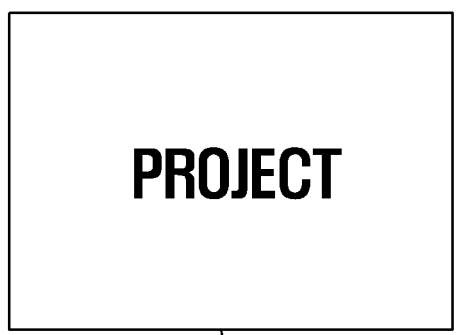
740
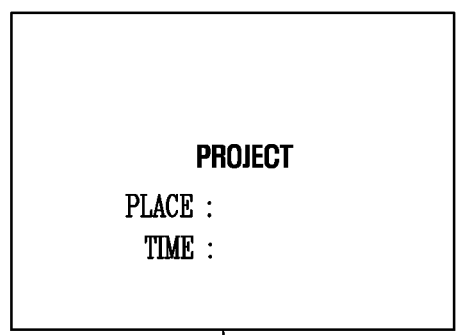
745

FIG. 7E
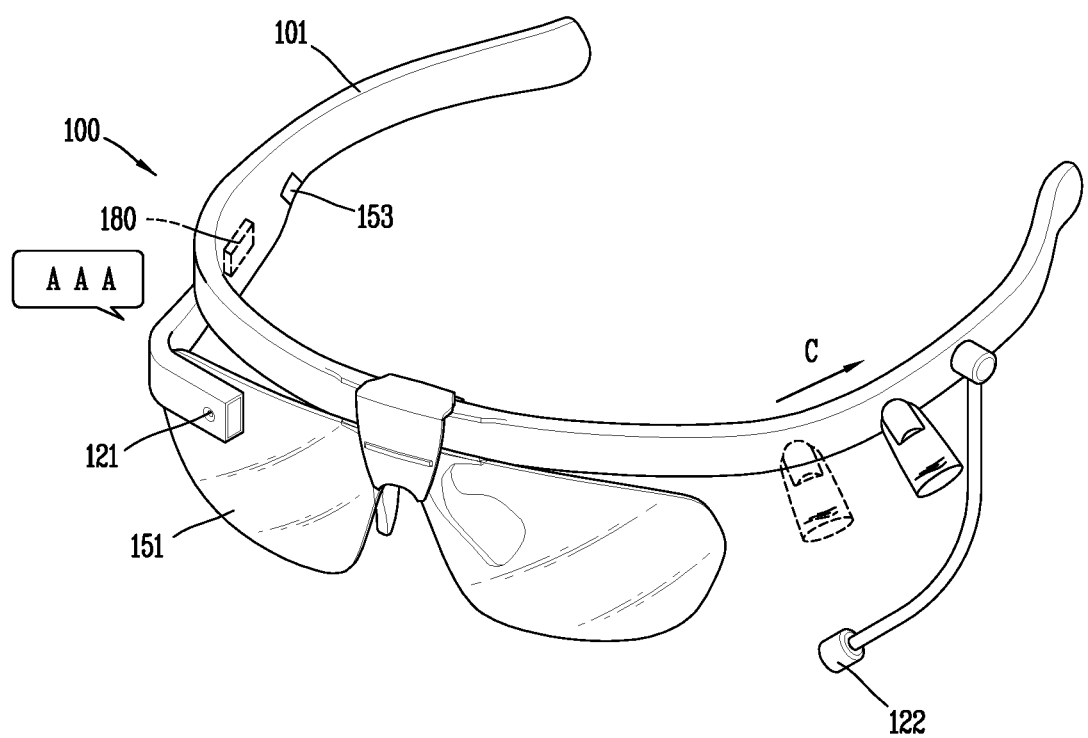
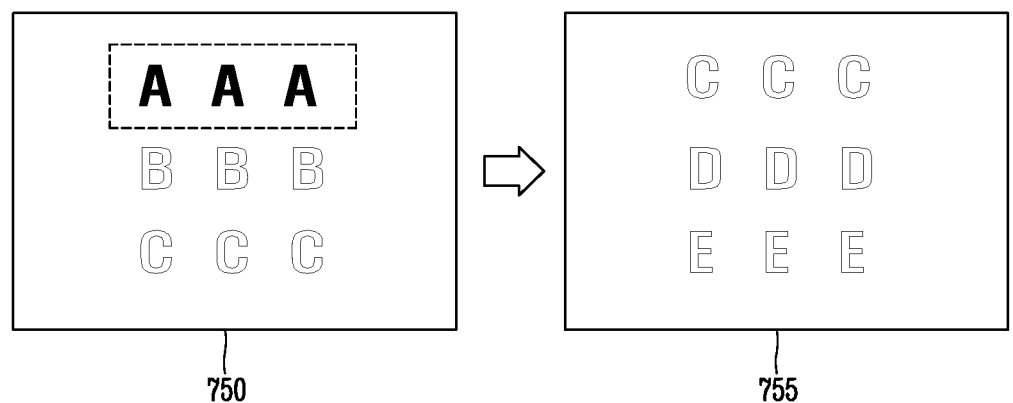

FIG. 7F
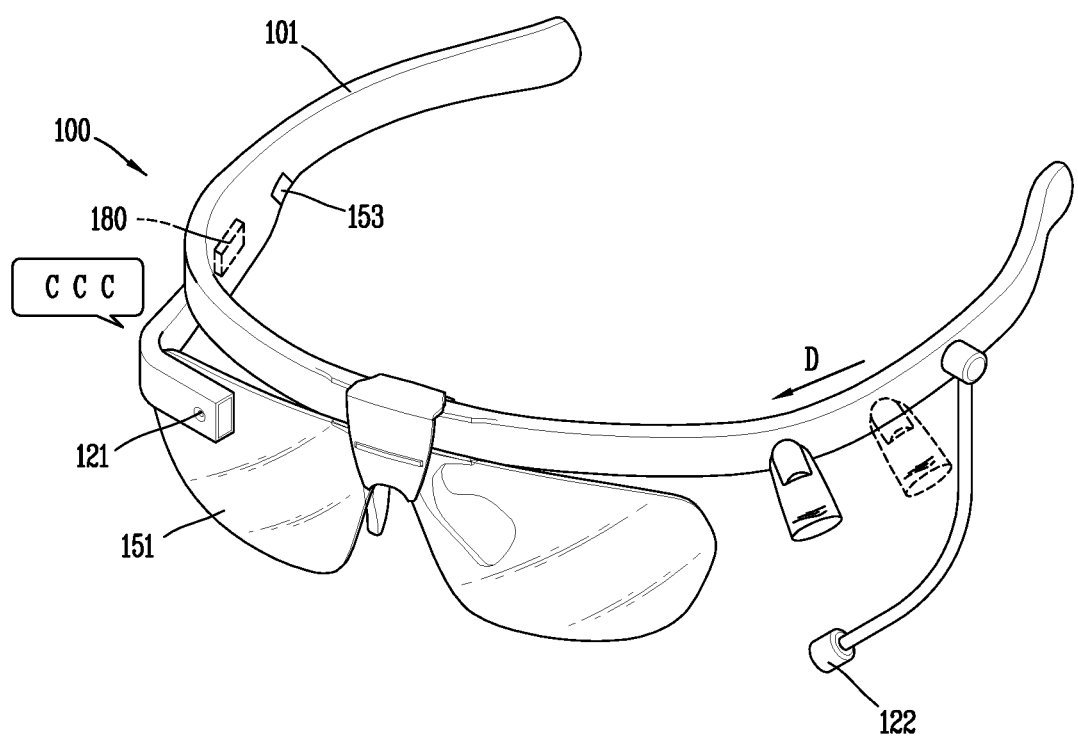
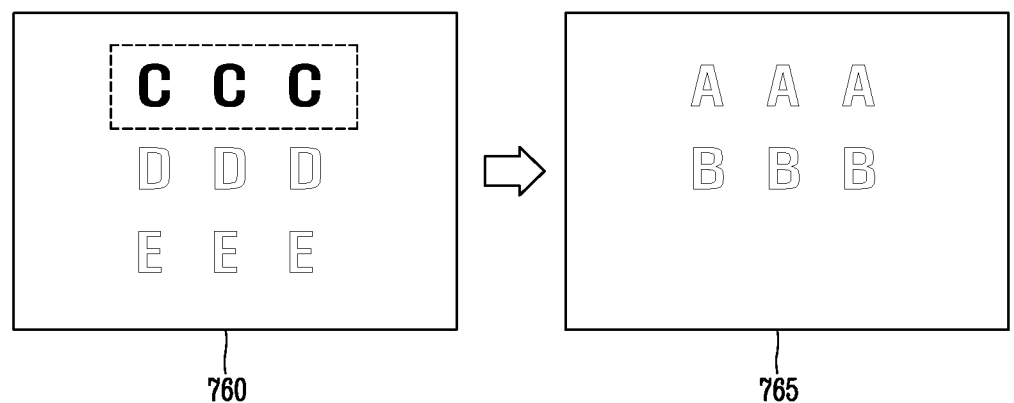

FIG. 7G
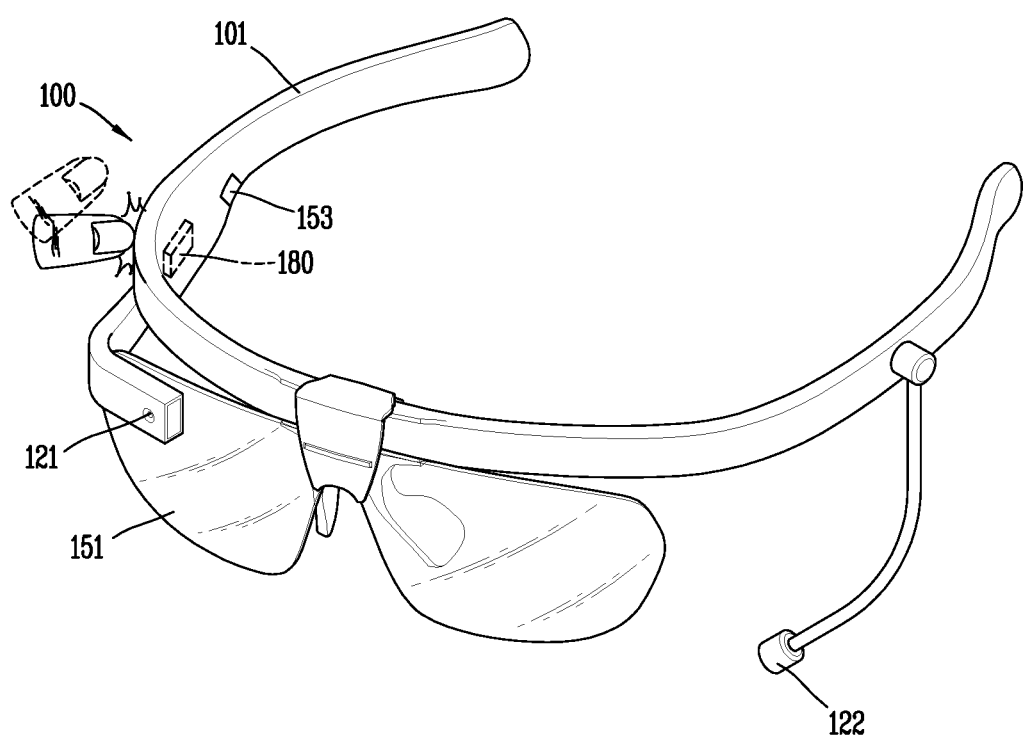
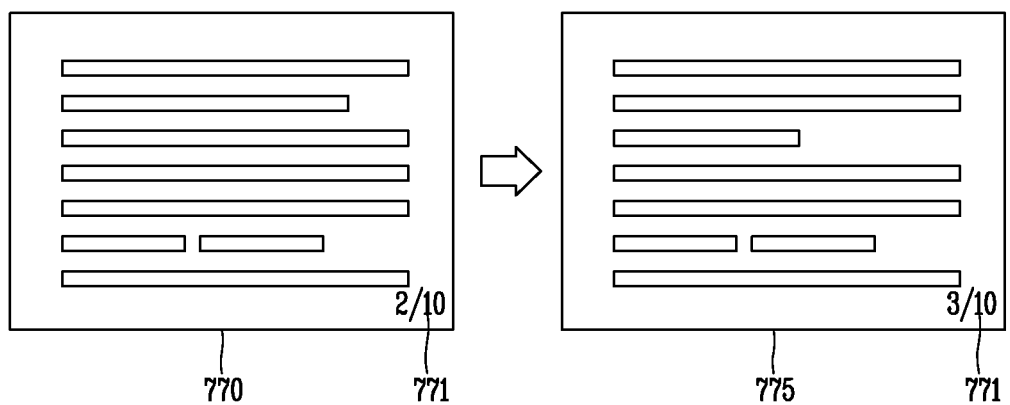

FIG. 7H
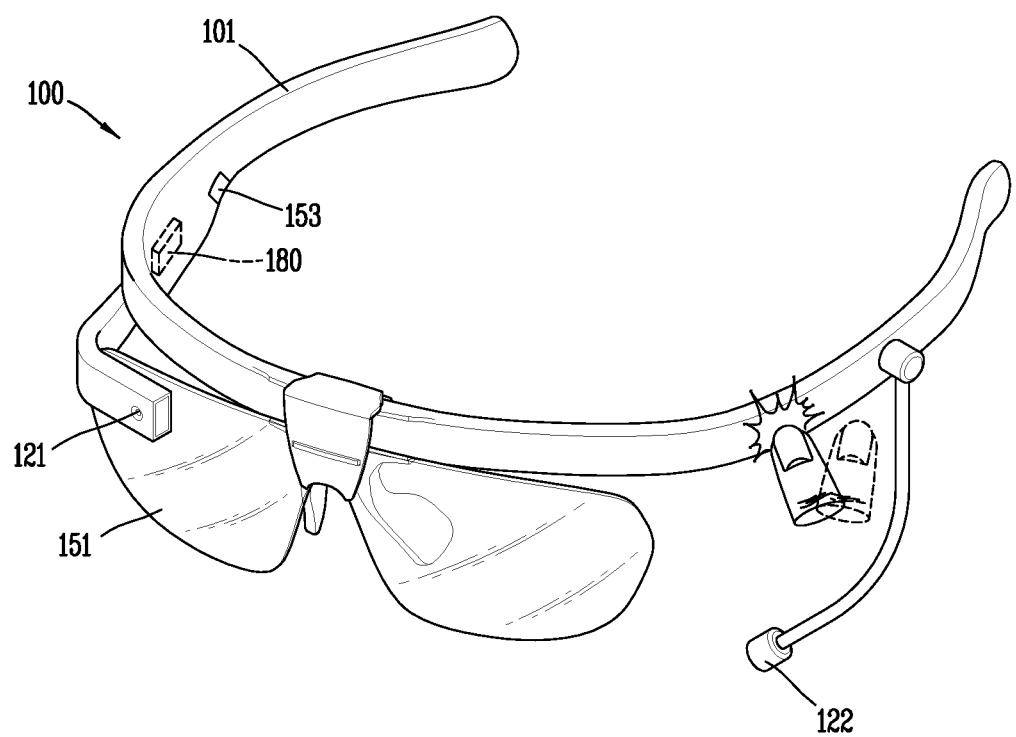
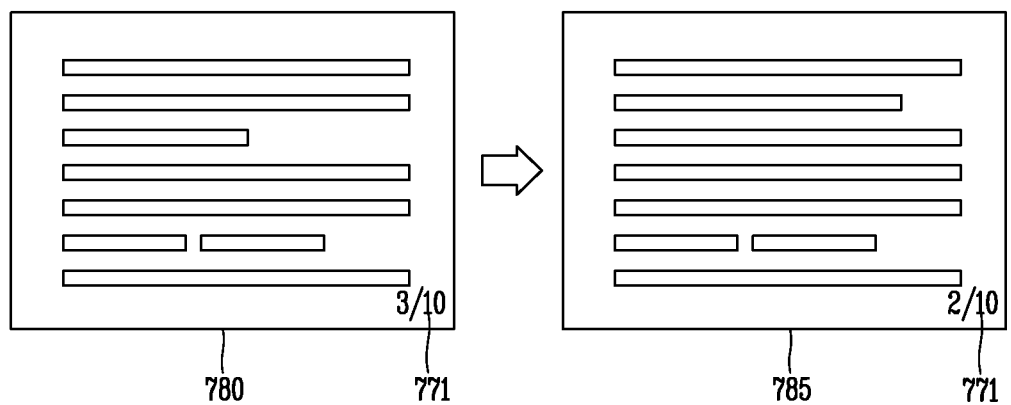

FIG. 9A
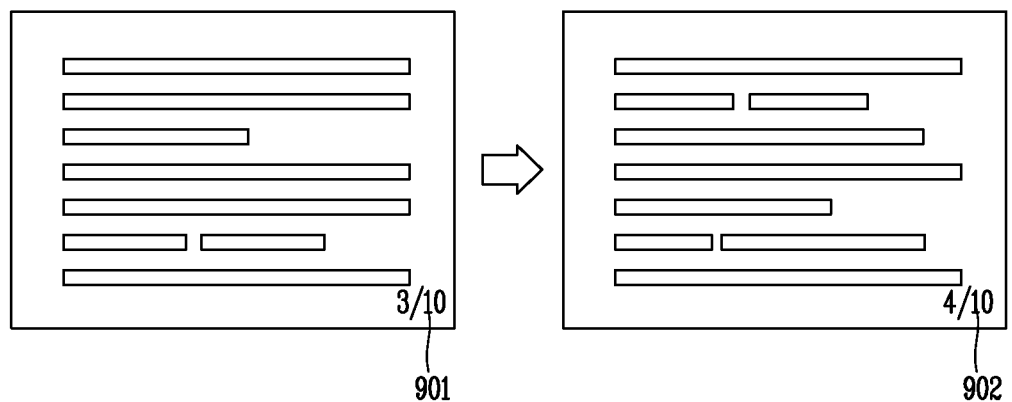
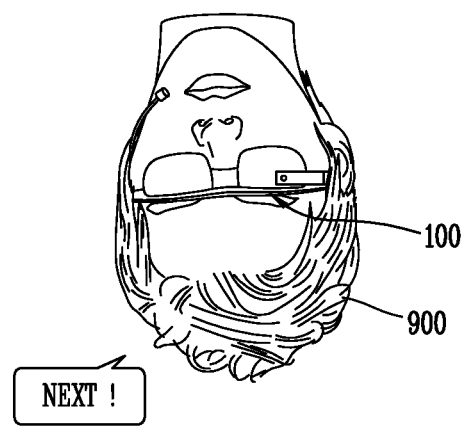

FIG. 9B
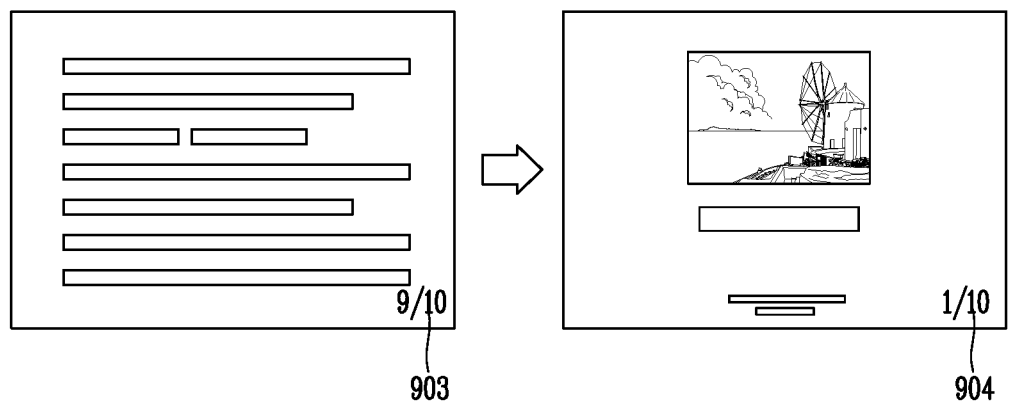
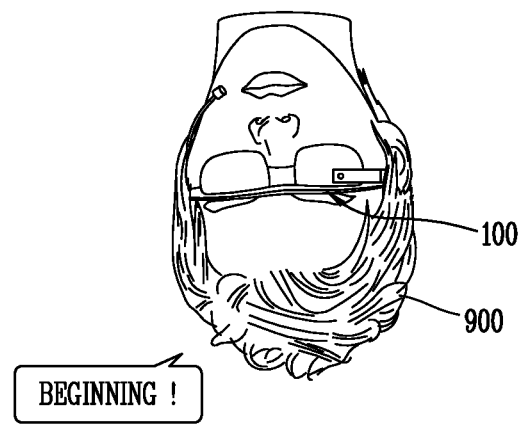

DISPLAY DEVICE AND METHOD OF OPERATING THE SAME

CROSS-REFERENCE TO RELATED APPLICATIONS

This application is a Continuation of co-pending application Ser. No. 14/186,176, filed on Feb. 21, 2014, which claims priority under 35 U.S.C. § 119(a) to Application No. 10-2013-0106742, filed in Republic of Korea on Sep. 5, 2013, all of which are hereby expressly incorporated by reference into the present application.

BACKGROUND OF THE INVENTION

1. Field of the Invention

The present invention relates to a display device and a method of operating the display device and particularly to a display device connected to a projector for proceeding with a presentation and configured to be mountable on a specific portion of a body and a method of operating the display device.

2. Background of the Invention

A projector projects image information transferred from a predetermined display device onto a screen in order to proceed with a presentation and shows images to attendants. A display for transmitting image information to the projector is broadly categorized by mobility into a mobile/portable terminal and a stationary terminal. The mobile terminal is further categorized by portability into a handheld terminal and a vehicle-mounted terminal.

In response to an increasing demand for diversified functions, the terminal is formed as a multimedia player with multiple functions such as shooting a photographic object as a still image or moving images, reproducing digital audio and video compression files, playing a game, receiving a broadcast or the like. Furthermore, structural and software modifications to the multimedia player are considered for supporting and improving functions of the display device.

In addition, a presenter of the presentation proceeds with the presentation using the images projected onto the screen and the like through the projector connected to the display device. However, occasionally, the presentation does not proceed smoothly only with the images projected onto the screen.

For example, the presenter should provide an explanation while ensuring a planned progress in the presentation and at the same time measuring concentration of the attendants and understandability of the presentation to the attendants. However, if the presenter proceeds with the presentation while grasping various situations and types of information in this manner, occasionally, he/she finds his/her explanation insufficient, is time-pressed, omits the important explanation or is at a loss for explanation.

In addition, if the presenter asks a question relating to the explanation during the presentation in progress, occasionally he/she should remember the question for a long time or find the time too insufficient for effectively answering the question.

Accordingly, there is an increasing need for providing the presenter with a way to help him/her smoothly proceed with the presentation entailing the explanation. An example of this is a display device capable of being mounted on the head of the wearer.

An example of such a display device is smart glasses. Further, a function executable on an existing mobile terminal is conveniently executed also on the smart glasses, which is an example of a wearable device mounted on a specific portion of the body. However, there are disadvantages in that the smart glasses are small in size, and information is transferable to the wearer, that is, the presenter of the presentation is limited.

Particularly, because the presenter has to provide an explanation without any interruption, the information has to be provided to presenter in a manner not to prevent the explanation from being interrupted.

SUMMARY OF THE INVENTION

Therefore, an aspect of the detailed description is to provide a display device mountable on the body of a presenter of a presentation, such as the head, which provides content information to be next presented and time information in accordance with details that the presenter currently presents and with a speed at which the presenter makes the presentation, and a method of operating the display device.

Another aspect of the detailed description is to provide a display device mountable on the body of a presenter of a presentation, such as the head, which provides related information so as to smoothly proceed with the presentation although an event happens unexpectedly, such as when the presenter is in a tense state or when the presenter forgets details of the presentation, and a method of operating the display device.

Still another of the detailed description is to provide a display device configured to provide a presenter with information relating to a presentation, transferred from an external apparatus, or to generate feedback on the information and provide the feedback, and a method of operating the display device.

To achieve these and other advantages and in accordance with the purpose of this specification, as embodied and broadly described herein, there is provided an output device configured to be connected to a projector for proceeding with a presentation and thus to output content information relating to an image to be projected onto a screen, the output device including a main body configured to be mountable on a specific portion of a body, a microphone integrally connected to the main body, and a controller that matches voice information, input through the microphone, and already-stored content details associated with the presentation and outputs at least a portion of the content details that follow a portion of the content details, which is matched to the voice information by a reference value or above.

In the output device, the output unit may be a bone conduction presenter integrally connected to the main body and the controller may convert the following content details into a voice signal, transfer the voice signal to the bone conduction presenter, and adjust an output speed of the voice signal so that the output speed corresponds to an input speed of the voice information.

To achieve these and other advantages and in accordance with the purpose of this specification, as embodied and broadly described herein, there is provided a display device configured to be connected to a projector for proceeding with a presentation and thus to output content information relating to an image to be projected onto a screen, the display device including a main body configured to be mountable on a specific portion of a body, a microphone integrally connected to the main body, a controller that matches voice information, input through the microphone, and already-stored content details associated with the presentation and detects the content information that follows a portion of the content details, which is matched to the voice information by a reference value or above, and a display connected to the main body, is arranged in a position corresponding to at least one among wearer's both eyes, and thus is configured to display at least a portion of the detected following content information.

In the display device, the controller may adjust an output speed of the following content information displayed on the display, so that the output speed of the following content information corresponds to an input speed of the voice information, and additional information relating to the following content information may be displayed on the display, based on the output speed. In the display device, the additional information may include at least one among information on a wearer of the main body, time information calculated based on the input speed of the voice information and a remaining amount of content, information on an amount of the already-stored content, information indicating the extent to which the presentation proceeds, additional information relating to the following content information, and information on attendants of the presentation.

In the display device, the already-assigned content may include multiple pages and the controller may determine an output range of the following content information to be displayed on the display, based on time information already assigned to each of the multiple pages and on information on a remaining amount of presentation time.

The display device may further a sensing unit for detecting living body information (a bio-signal) on a wearer, which is integrally connected to the main body, in which the controller may monitor a state of the wearer, based on the detected living body information, and when the wearer is determined to be is a tense state, perform control so that an output size of the following content information is changed or a highlighting effect is output.

In display device, a touch sensor that detects a touch input may be provided in at least a region of the main body, in which a first camera for detecting a gesture input by a wearer may be included in the outside surface of the main body, and the controller may perform control so that a display change occurs in the display, based on the gesture input by the wearer recognized by at least one among the touch sensor and the first camera.

In the display device, in response to the gesture input in which the wearer shakes his/her hand positioned between the main body and the screen when the main body and the screen face each other, the controller may perform control so that an image output to the display is projected onto the screen connected to the projector.

In the display device, the controller may magnify the following content information displayed on the display in a navigating manner, in response to the gesture input that rotates multiple touch starting points that are applied to a border region of the display, in a first direction.

In the display device, the controller may reduce the following content information displayed on the display in a navigating manner, in response to the gesture input that rotates multiple touch starting points that are applied to a border region of the display, in a second direction.

In the display device, when an input that drags a touch applied to a region of the main body in a first direction is applied, the controller may scroll through lines of the following content information displayed on the display in a first direction and when an input that drags the touch applied to the region of the main body in a second direction, the controller may scroll through the lines of the following content information displayed on the display in a second direction.

In the display device, based on a touch input that taps on a first region of the main body a predetermined number of time, the controller may turn over a document page corresponding to the following content information in a first direction, and based on a touch input that taps on a second region of the main body the predetermined number of time, the controller may turn over the document page corresponding to the following content information in a second direction.

The display device further includes a second camera for tracking a wearer's stare, which is connected to the inside of the main body, in which when the wearer's stare is fixed to a specific object output to the display, the controller may perform control so that a result of an additional search associated with a specific object is displayed on a region of the display.

In the display device, in response to the wearer's stare being fixed to the screen for a predetermined time when an input of the voice information is not applied, the controller may output a highlighting effect to a script of the following content information displayed on the display, or convert the following content information into a voice signal and outputs the voice signal.

In the display device, the controller may control the display so that a display change corresponding to a predetermined voice command input through the microphone occurs.

In the display device, when the voice information input through the microphone remains unmatched to the already-stored content details for a predetermined time, the controller may perform control so that a predetermined alarm is output.

In the display device, the predetermined alarm may include at least one or more among a sound message, a vibration, and a highlighting effect for the following content information.

The display device may further include a first display and a second display that correspond to the wearer's left and right eyes, respectively, in which the controller may perform control so that visual information corresponding to the voice information input through the microphone is output to any one of the first display and the second display and additional information relating to the following content information or a result of an additional search is output to the other.

The display device may further include a wireless communication unit that receives a wireless signal corresponding to information relating to the presentation, which is connected to an external apparatus, in which the controller may convert the wireless signal into characters, and displays the characters on a region of the display or store the characters in a document file format in which the characters are transmittable to the outside.

In the display device, the wireless communication unit may be configured so that at least an item of data is transmittable to the connected external apparatus, and the controller may search the already-stored content details using the characters as key words and control the display so that data corresponding to a result of the search is displayed on the display or control the wireless communication unit so that the data corresponding to the result of the search is t transmitted by the wireless communication unit.

The display device may further include a wireless communication unit for processing with wireless communication with the projector, in which when the gesture input set for transmitting the already-stored content associated with the presentation to the project, is detected, the controller may control the project so that a screen displayed on the display is output to the screen at the same time.

To achieve these and other advantages and in accordance with the purpose of this specification, as embodied and broadly described herein, there is provided a method of operating a display device configured to be connected to a projector for proceeding with a presentation and thus to output content information relating to an image to be projected onto a screen, the method including matching voice information, input through the microphone connected to a main body, and already-stored content details associated with the presentation, detecting the content information that follows a portion of the content details, which is matched to the voice information by a reference value or above, displaying at least a portion of details corresponding to a position of the following content information on a display arranged so as to correspond to at least one among both eyes of a wearer of the main body; and adjusting an output speed of the following content information displayed on the display so that the output speed of the following content information corresponds to an input speed of the voice information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram illustrating an example of a display device according to an embodiment of the present invention;

FIG. 5 is a flowchart illustrating a method of operating the display device according to the embodiment of the present invention;

FIGS. 7A to 7H are diagrams illustrating examples in which a screen output to the display device, or an image projected onto the display device is controlled based on various movements of a wearer according to the embodiment of the present invention;

FIGS. 9A to 9B are diagrams illustrating examples in which the screen output to the display device is controlled based on a voice command from the wearer according to the embodiment of the present invention;

DETAILED DESCRIPTION OF THE INVENTION

Figure 2A:
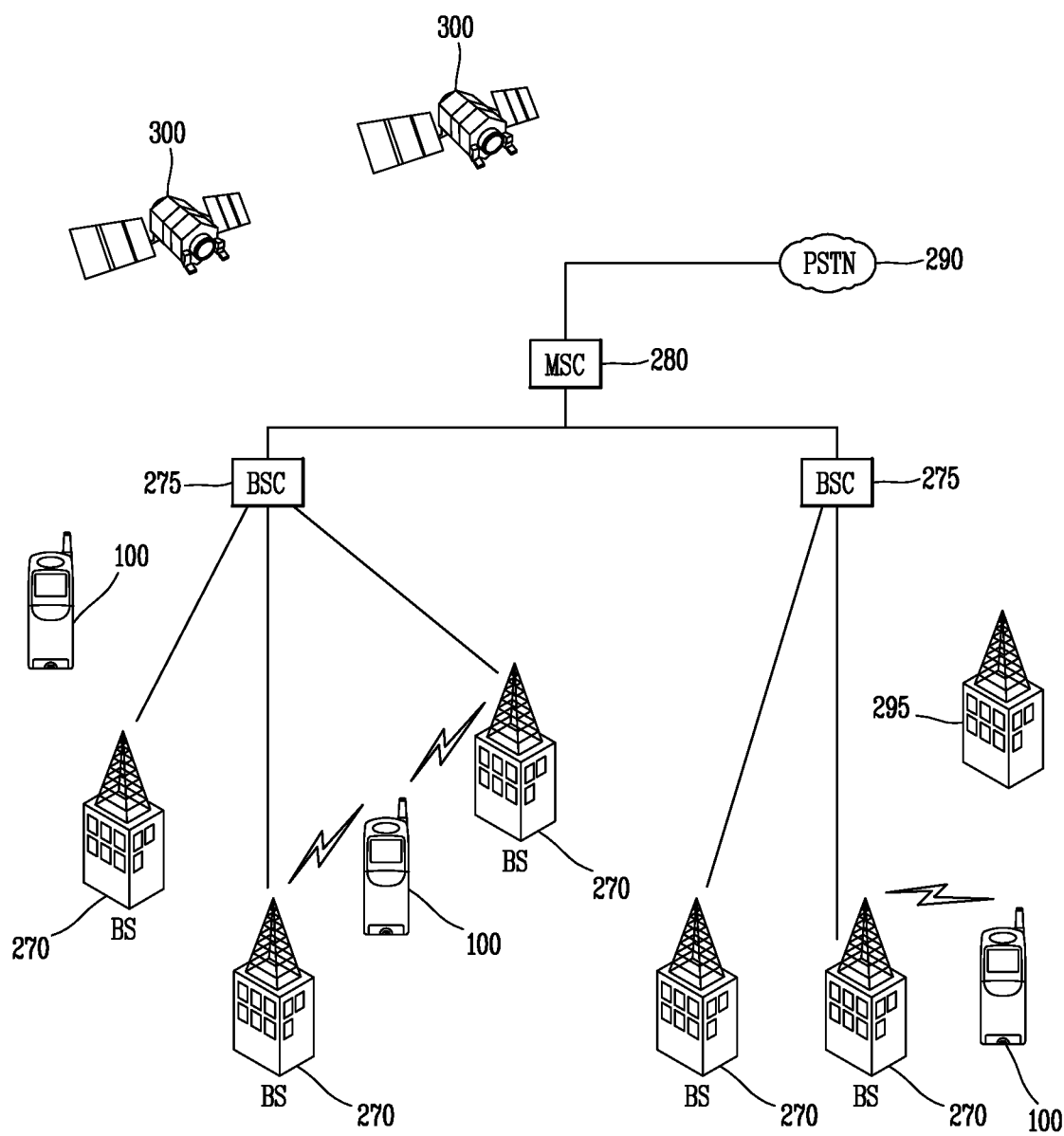
FIGS. 2A and 2B are diagrams illustrating a telecommunication system in which the display device according to the embodiment of the present invention can operate.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

FIG. 1 is a block diagram of a display device 100 in accordance with one exemplary embodiment. The display device 100 may comprise components, such as a wireless communication unit 110, an Audio/Video (AN) input unit 120, a user input unit 130, a sensing unit 140, an output unit 150, a memory 160, an interface unit 170, a controller 180, a power supply 190 and the like. FIG. 1 shows the display device 100 having various components, but it is understood that implementing all of the illustrated components is not a requirement. Greater or fewer components may alternatively be implemented.

The wireless communication unit 110 may typically include one or more modules which permit wireless communications between the display device 100 and a wireless communication system or between the display device 100 and a network within which the display device 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the display device. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external display device, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the display device. This module may be internally or externally coupled to the display device 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a display device. An example of the location information module 115 may include a Global Position System (GPS) module.

Still referring to FIG. 1, the A/V input unit 120 is configured to provide audio or video signal input to the display device. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the display device.

The microphone 122 may receive an external audio signal while the display device is in a particular mode, such as a phone call mode, a recording mode, a voice recognition mode, or the like. This audio signal is processed into digital data. The processed digital data is converted for output into a format transmittable to a mobile communication base station via the mobile communication module 112 for the phone call mode. The microphone 122 may include assorted noise removing algorithms to remove noise generated in the course of receiving the external audio signal.

The user input unit 130 may generate input data input by a user to control the operation of the display device. The user input unit 130 may include a keypad, a dome switch, a touchpad (e.g., static pressure/capacitance), a jog wheel, a jog switch and the like.

The sensing unit 140 provides status measurements of various aspects of the display device. For instance, the sensing unit 140 may detect an open/close status of the display device, a change in a location of the display device 100, a presence or absence of user contact with the display device 100, the location of the display device 100, acceleration/deceleration of the display device 100, and the like, so as to generate a sensing signal for controlling the operation of the display device 100.

For example, regarding a slide-type display device, the sensing unit 140 may sense whether a sliding portion of the display device is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display 151, an audio output module 153, an alarm unit 154 and a haptic module 155.

The display 151 may output information processed in the display device 100. For example, when the display device is operating in a phone call mode, the display 151 will provide a User Interface (UI) or a Graphic User Interface (GUI), which includes information associated with the call. As another example, if the display device is in a video call mode or a capturing mode, the display 151 may additionally or alternatively display images captured and/or received, UI, or GUI.

The display 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display 151 may also be implemented to be optically transparent. Under this configuration, a user can view an object positioned at a rear side of a terminal body through a region occupied by the display 151 of the terminal body.

The display 151 may be implemented in two or more in number according to a configured aspect of the display device 100. For instance, a plurality of the displays 151 may be arranged on one surface to be spaced apart from or integrated with each other, or may be arranged on different surfaces.

The display 151 may also be implemented as a stereoscopic display unit 152 for displaying stereoscopic images. Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display 151 and a touch sensitive sensor (referred to as a touch sensor) have a layered structure therebetween (referred to as a 'touch screen'), the display 151 may be used as an input device as well as an output device. The touch sensor may be implemented as a touch film, a touch sheet, a touchpad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display 151 has been touched.

Still referring to FIG. 1, a proximity sensor 141 may be arranged at an inner region of the display device 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen)

applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor. For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the display device 100 (e.g., a call signal reception sound, a message reception sound, etc.). The audio output module 153 may include a speaker, a buzzer or the like.

The alarm unit 154 outputs a signal for informing about an occurrence of an event of the display device 100. Events generated in the display device may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the display device 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the display device 100 may be operated in relation to a web storage device that performs the storage function of the memory 160 over the Internet.

The interface unit 170 serves as an interface with every external device connected with the display device 100. For example, the external devices may transmit data to an external device, receives and transmits power to each element of the display device 100, or transmits internal data of the display device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the display device 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the display device 100 is connected with an external cradle, the interface unit 170 may serve as a passage to allow power from the cradle to be supplied therethrough to the display device 100 or may serve as a passage to allow various command signals inputted by the user from the cradle to be transferred to the display device therethrough. Various command signals or power inputted from the cradle may operate as signals for recognizing that the display device is properly mounted on the cradle.

The controller 180 typically controls the general operations of the display device. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the display device meets a preset condition. Also, the controller 180 may control a lock screen displayed in the lock state based on a touch input sensed on the display 151 in the lock state of the display device.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Hereinafter, a communication system which is operable with the display device 100 according to an embodiment of the present invention will be described.

Figure 2B:
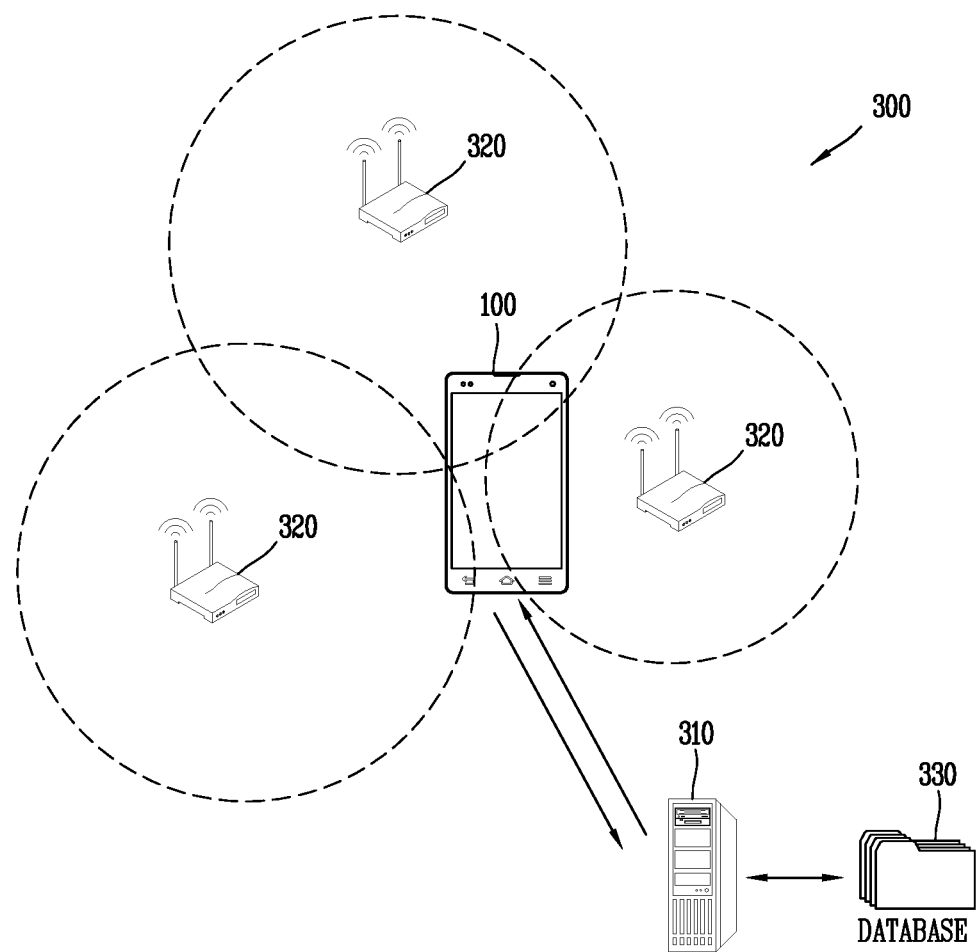

FIGS. 2A and 2B are conceptual views of a communication system operable with a display device 100 in accordance with the present invention.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system. Referring now to FIG. 2A, a CDMA wireless communication system is shown having a plurality of display device s 100, a plurality of base stations (BSs) 270, base station controllers (BSCs) 275, and a mobile switching center (MSC) 280.

The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the display device s 100 operating within the system. The broadcast receiving module 111 (FIG. 1B) is typically configured inside the display device 100 to receive broadcast signals transmitted by the BT 295.

FIG. 2A further depicts several Global Positioning System (GPS) satellites 300. Such satellites 300 facilitate locating the position of at least one of plural display device s 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various display device s 100. The display devices 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the display device s 100.

Hereinafter, description will be given of a method for acquiring location information of a display device using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the display device 100 using a WiFi module provided in the display device 100 and a wireless access point 320 for transmitting and receiving to and from the WiFi module.

The WiFi positioning system 300 may include a WiFi location determination server 310, a display device 100, a wireless access point (AP) 320 connected to the display device 100, and a database 330 stored with any wireless AP information.

The WiFi location determination server 310 extracts the information of the wireless AP 320 connected to the display device 100 based on a location information request message (or signal) of the display device 100. The information of the wireless AP 320 may be transmitted to the WiFi location determination server 310 through the display device 100 or transmitted to the WiFi location determination server 310 from the wireless AP 320.

The information of the wireless AP extracted based on the location information request message of the display device 100 may be at least one of MAC address, SSID, RSSI, channel information, privacy, network type, signal strength and noise strength.

The Wi-Fi location determination server 310 receives the information of the wireless AP 320 connected to the display device 100 as described above, and compares the received wireless AP 320 information with information contained in the pre-established database 330 to extract (or analyze) the location information of the display device 100.

In addition, referring to FIG. 2B, as an example, the wireless AP connected to the display device 100 is illustrated as a first, a second, and a third wireless AP 320. However, the number of wireless APs connected to the display device 100 may be changed in various ways according to a wireless communication environment in which the display device 100 is located. When the display device 100 is connected to at least one of wireless APs, the WiFi positioning system 300 can track the location of the display device 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the display device 100 from the database 330 to extract the location information matched to the searched wireless AP, thereby extracting the location information of the display device 100.

Furthermore, the extracted location information of the display device 100 may be transmitted to the display device 100 through the WiFi location determination server 310, thereby acquiring the location information of the display device 100.

Figure 3:
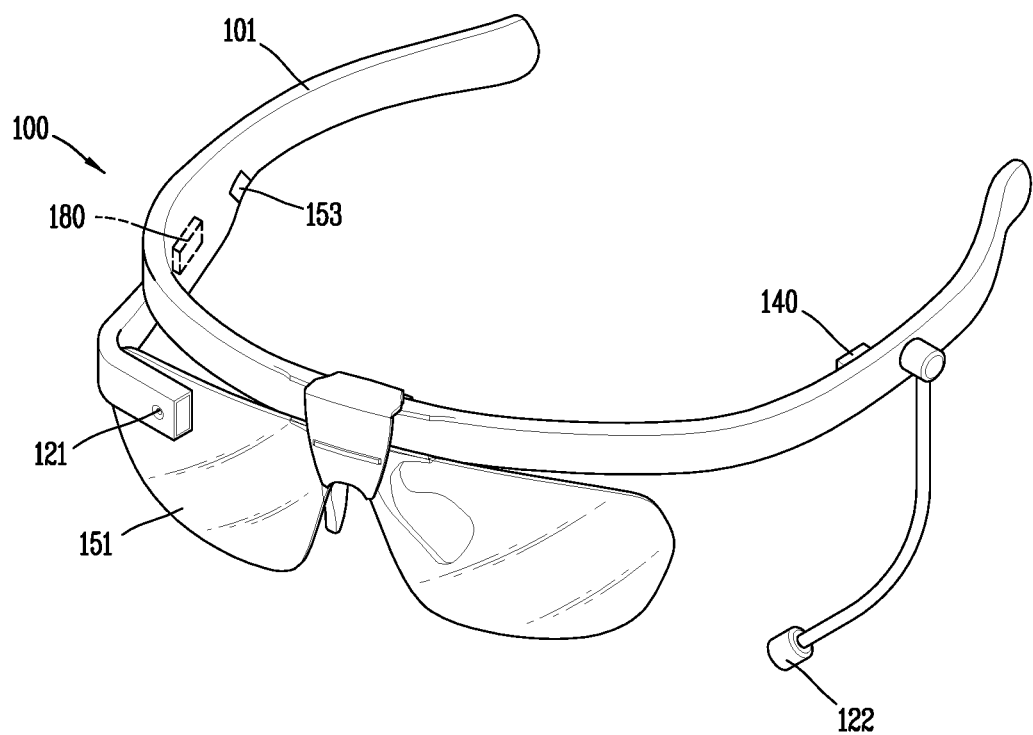
FIG. 3 is a diagram illustrating an example of the display device configured to be mounted on a specific portion of a body according to the embodiment of the present invention.

Next, FIG. 3 is a diagram illustrating a configuration in which the display device 100 according to one embodiment of the present invention described referring to FIG. 1 is mountable on a body's specific portion. Referring to FIG. 3, the display device 100 includes a main body frame 101, the microphone 122, an output unit (the alarm unit 153 and/or the display 151) and the controller 180.

The display device 100 according to an embodiment of the present invention is realized as a head-mounted display (HMD) device. As a specific example, the display device 100 according to an embodiment of the present invention is realized as smart glasses.

In addition, the display device 100 according to the embodiment of the present invention is configured to be mountable on a specific portion of the body, such as a head, a wrist, a neck, and an ear, or on top of clothing. In addition, the touch sensor that detects a wearer's touch input is arranged at least on one point, or one region of the main body frame 101.

If the display 151 is provided to the display device 100 according to an embodiment of the present invention, visual information relating to a presentation is in the 2D or 3D form. In this instance, the display 151 is combined with the main body 100 so that the display 151 is arranged in a position corresponding to at least one among the wearer's left and right eyes and outputs the visual information relating to the presentation.

Further, from the conceptual point of view, the visual information relating to the presentation is content associated with the presentation to proceed, which is already stored in the main body 100, or is data received from an external apparatus, or is all objects that are generated according to a wearer's input. For example, the visual information relating to the presentation includes a text file for presentation, inquiry data relating to the presentation received from the external apparatus and the like.

In addition, the display device 100 according to an embodiment of the present invention may be an output device without a display. In this instance, outputting of the information relating to the presentation is performed through a presenter (specifically, a bone conduction presenter).

The microphone 122, connected to the main body 100, receives voice of a wearer who makes a presentation. In addition, the controller 180 matches voice information input in real time through the microphone 122, to content details associated with the already-stored presentation. If a portion of the content details matched to the voice information by a reference value or above is detected, the controller 180 outputs content details that follow the matched portion, that is, at least a portion of details that the wearer next presents, to the display 151 or the speaker 153.

Further, the controller 180 adjusts an output speed of the following content details that are output to the display 151 or the presenter 153, according to an input speed of the voice information input in real time into the microphone 122. For example, if a script of the details that the wearer successively presents, are output line by line, the faster the wearer makes a presentation, the faster the script lines output to the display 151 are scrolled. Conversely, the slower the wearer makes a presentation, the more slowly the script lines output to the display 151 are scrolled. Alternatively, when the wearer makes a presentation slowly, the script lines remain in a stationary state.

Figure 4:
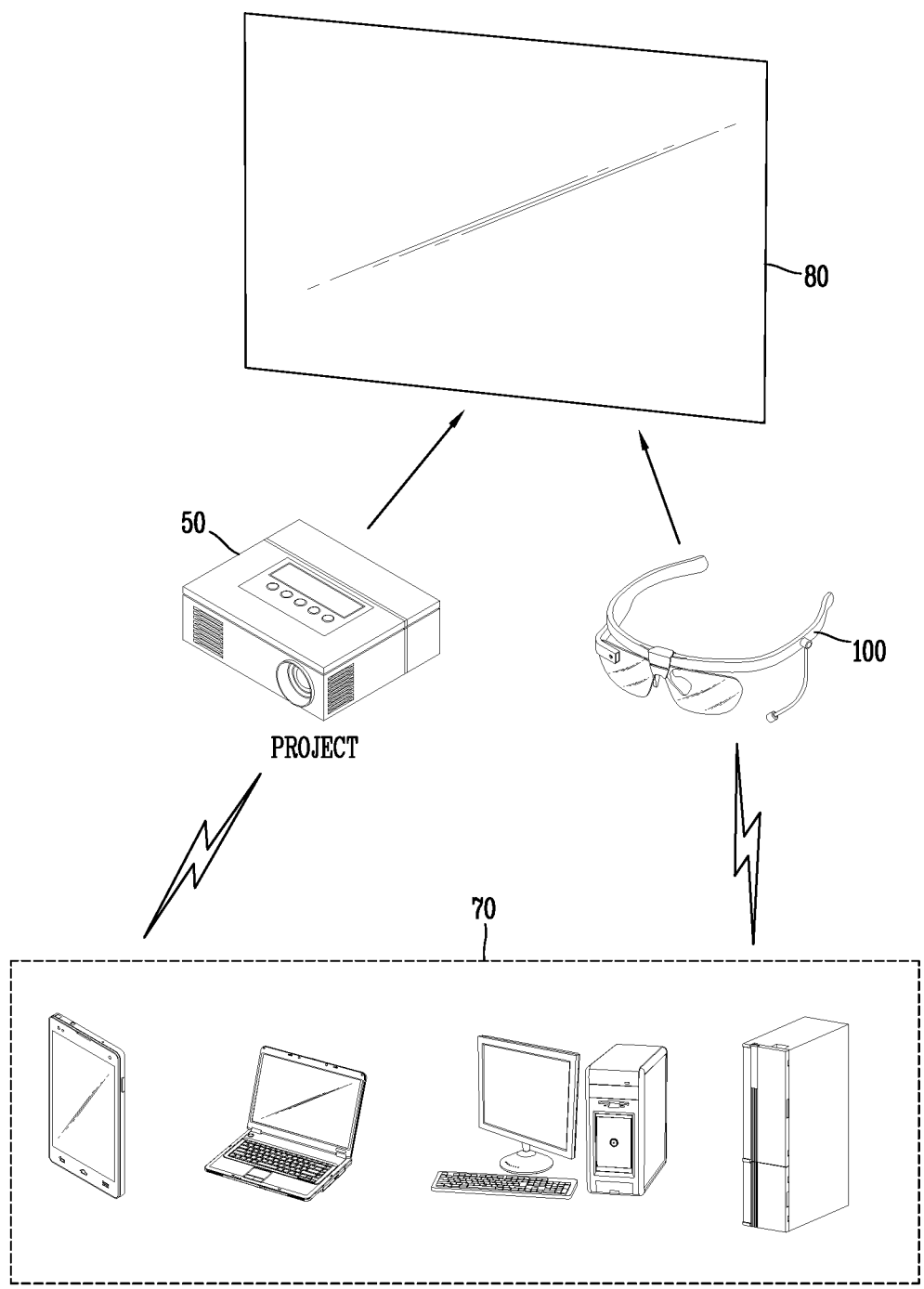
FIG. 4 is a diagram illustrating the display device according to the embodiment of the present invention and a system connected to the display device to proceed with a presentation.

Next, referring to FIG. 4, the display device according to the embodiment of the present invention, and a system, connected to the display device, for making a presentation are described. As illustrated in FIG. 4, the display device 100 according to the embodiment of the present invention is connected to a projector 50 for projecting an image onto a screen 80. In addition, the display device 100 may be connected to another display device that provides the projector 50 with video information, for example, a mobile terminal 70.

Here, an example of another display device 80 wirelessly connected to the display device 100 according to the embodiment of the present invention is a mobile phone, a smart phone, a laptop computer, a personal digital assistant (PDA), a portable multimedia player (PMP), a navigator, a digital TV set, or a desktop computer. Alternatively, the display device 80 may be the same as the display device 100 according to the embodiment of the present invention. The other display devices 70 described above are collectively referred to as the "external apparatus."

The external apparatus 70, connected to the projector 50, provides the video information to be projected onto the screen 80. In addition, the external apparatus 70 communicates with the display device 100 to receive the video information to be projected onto the screen 80. In addition, the external apparatus 70 communicates with the display device 100 to transmit data relating to the presentation to the display device 100.

Screen information and/or sound information that are output to the display device 100, as described above, are the content transmitted from the external apparatus 70, are the content already stored in a display device 200, or are data generated based on that content.

In addition, the display device 100 performs related operations, based on a wearer's gesture input, a wearer's voice command, or living body information on the wearer, or based on a control command received from the external apparatus 70. For example, the display device 100 displays a screen change that corresponds to a user's input or output a screen and/or sound that corresponds to the control command received from the external apparatus 70.

In addition, the projector 50 receives video information to be projected onto the screen 80 from the display device 100 according to the embodiment of the present invention or the external apparatus 70.

In the former case, the display device 100 plays a role of providing the wearer with the information relating to the presentation and at the same time plays a role of transmitting the information relating to the presentation to the projector 50. Further, the information provided to the wearer and the information provided to the projector 50 may be different information scope. For example, a larger amount of information is provided to the wearer who makes a presentation and a minimum amount of information for explanation is provided to the projector 50 that provides the video information to the screen.

Thus, when receiving the video information, the projector 50 signal-processes received R, G, B image signals in a manner that makes them suitable for an actual image form and realizes the result of signal processing as the actual image form, such as a laser or an LCD. Thereafter, the project 50 projects the actual image form enlargedly onto the screen 70.

In addition, a wireless or cable connection is made between the display device 100 and the external apparatus 70 and between an external apparatus 170 and the projector 50, for example, using a short-range communication standard, a wireless Internet standard such as Wi-Fi, or an external-apparatus interface standard such as a universal serial bus (USB).

In addition, if the connection is made between the display device 100 and the external apparatus 70, the display device 100 outputs the screen information, the same as the image to be projected onto the screen 80 through the projector 50, or outputs the screen information including the information more detailed than the screen-projected image. To do so, the display device 100 receives the data relating to the corresponding screen information from the external apparatus 70.

Further, the display device 100 operates detects a wearer's gesture through the camera provided in the main body, tracks a wearer's stare to execute a corresponding operation, or operates so that the corresponding screen information is transmitted to the external apparatus 70 for projecting onto the screen through the projector 50.

In addition, the display device 100 controls transmits the corresponding screen information directly to the projector 50 and thus control the image to be projected onto the screen 80. In this instance, the wearer of the display device 100 can control both the screen information output to the display device 100 and the screen information projected onto the screen 80, at the same time through a predetermined gesture input.

Figure 6A:
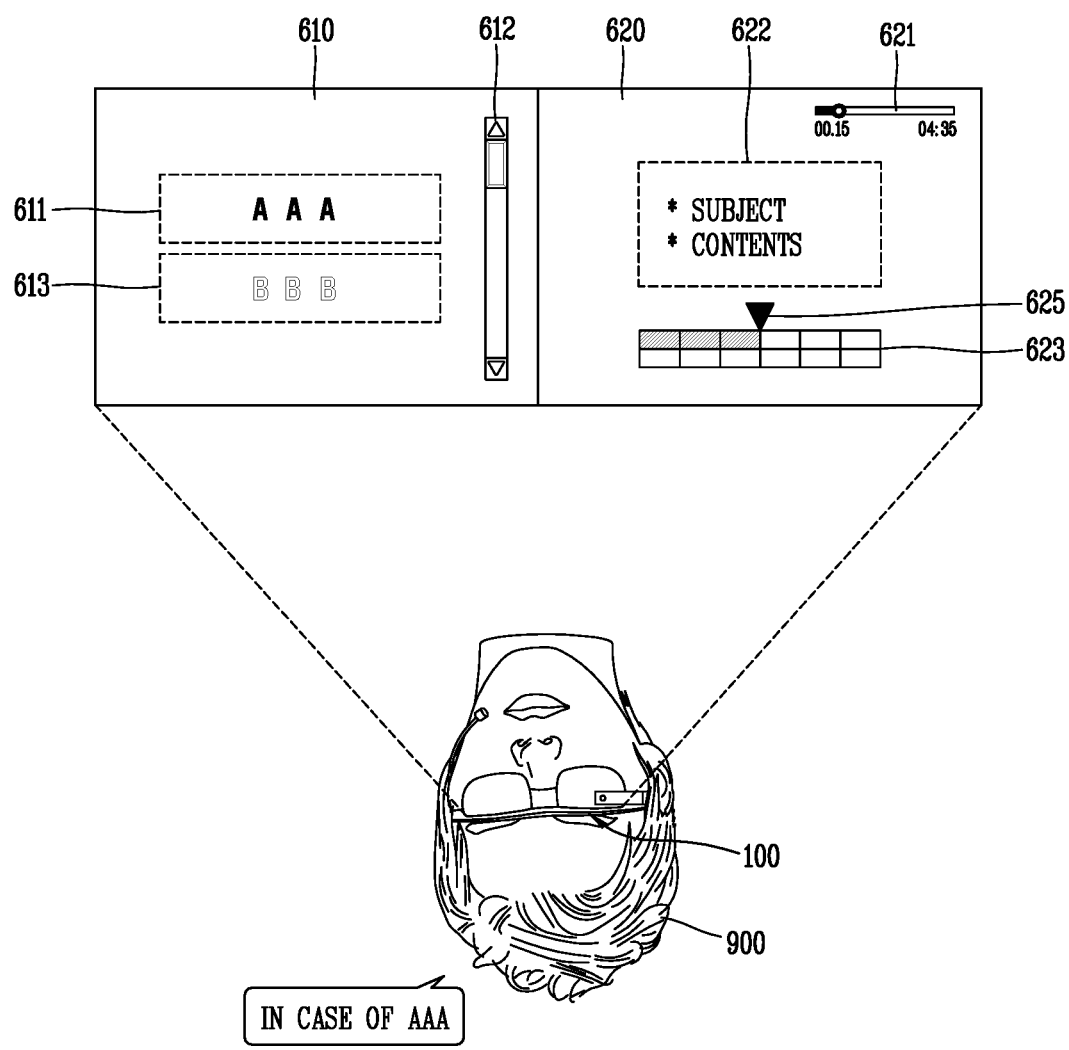
FIGS. 6A to 6C are diagrams illustrating the flowchart in FIG. 5.
Figure 6B:
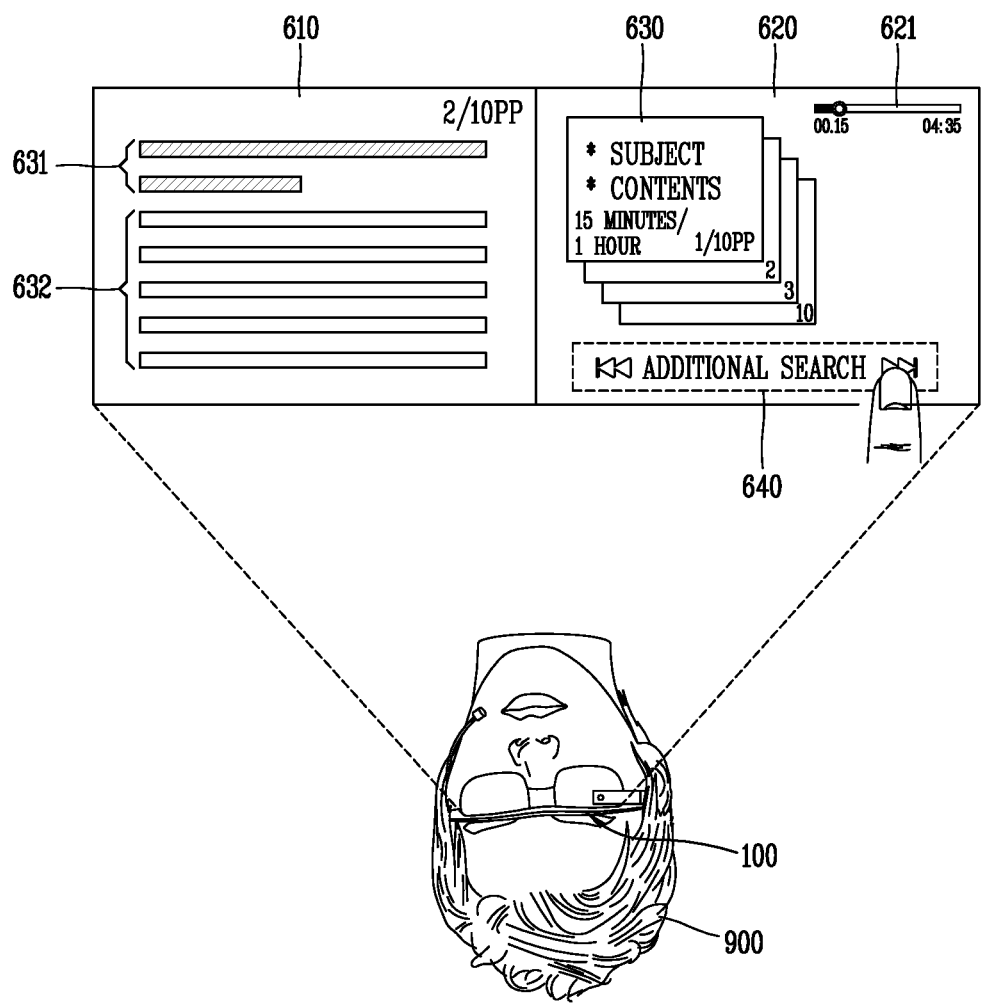
Figure 6C:
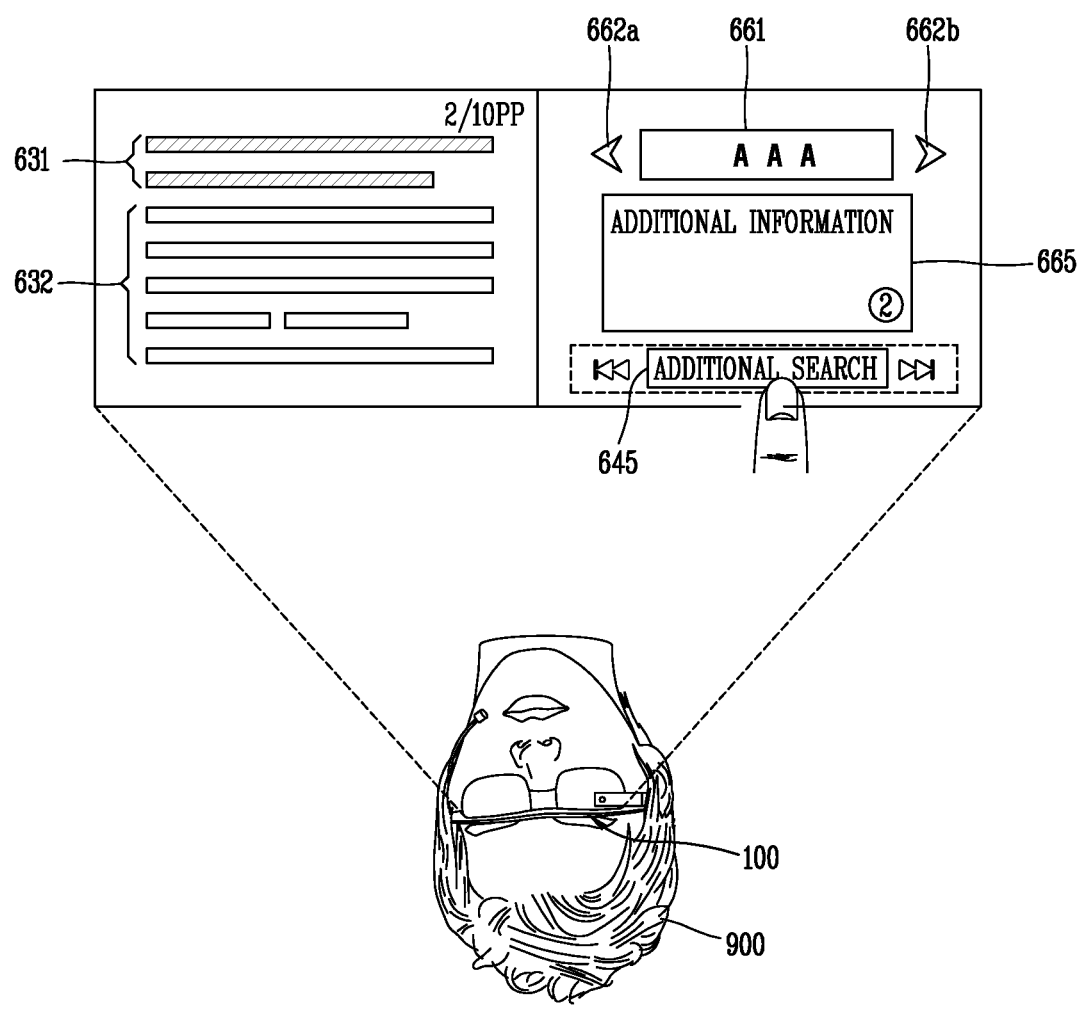

A method of operating the display device 100 for helping the presentation proceed is described below referring FIG. 5 and FIGS. 6A to 6C. In particular, FIG. 5 is a flowchart illustrating the method of operating the display device according to one embodiment of the present invention, and FIGS. 6A to 6C are diagrams illustrating the flowchart in FIG. 5.

Here, the display device 100, connected to the projector 50 capable of performing the presentation, outputs content information relating to the image projected onto the screen 80 (FIG. 4). In addition, the display device 100 is configured to be mounted on a body's specific portion. Here, as an example of the display device 100, the head-mounted display (HMD) is described for the purpose of description. However, the present invention is not limited to this example, embodiments according to an embodiment of the present invention are realized as a type of display device without a display, a type of display device in which an AR is applied and the screen is output to the display, or a type of display device in which is mountable on different portions of the body (for example, a wrist, a neck, an ear, or a shoulder) or on top of clothing.

In addition, the content associated with the presentation is in advance stored in the display device 100. Along with this content, additional information may be further stored, such as the time and date for presentation, a place for presentation, and the number of attendants. In addition, detailed information relating to tag setting for a specific object for the content associated with the presentation, linking to the specific object, and the like are in advance stored.

Further, if the content associated with the presentation is made from multiple pages, an importance level is assigned to each page or presentation time is in advance assigned to each page, and then the assigned importance level and presentation time are stored. In addition, it is preferable that the information is stored in advance before the presentation proceeds, but if necessary, it is possible for the external apparatus (a server) to provide the information while the presentation is in progress, and update of the information also is possible after the presentation is finished.

First, the display device 100 according to the embodiment of the present invention is mounted on the specific portion of the body of the wearer who makes a presentation. Accordingly, the display device 100 detects a mounted state and a mounted position and outputs an alarm corresponding to the mounting on the specific portion of the body.

In addition, when the projector 50, configured to project the image information relating to the presentation onto the screen 80, is turned on, the display device 100 automatically recognizes this and is connected to the projector 50, through the wearer's input or automatically.

When the controller 180 detects that the display device 100 is worn and connected to the projector 50 in an ON state (S501), the display device 100 outputs the corresponding alarm and thus the wearer can recognize starting of the presentation (S502). When the presentation begins (Yes in S502), the controller 180 of the display device 100 matches voice information on the wearer (or presenter of the presentation) input through the microphone 122 to the content details associated with already stored content in the display device 100 (S503).

Specifically, the controller 180 performs speech-to-text (STT) converting on the voice information input and then compares between the result of STT converting and characters in the content associated with the already-stored presentation to obtain the extent to which they are consistent with each other. Further, the controller 180 first determines whether the voice information input through the microphone 122 is consistent with the already-stored wearer's voice information. When they are determined not to be consistent with each other, the controller 180 does not perform the matching process.

According to one embodiment, the content associated with the already-stored presentation may be content that the wearer stores in advance in the display device 100 before the presentation begins. In addition, according to another embodiment, the content associated with the already-stored presentation may be content downloaded or streamed from the external apparatus 70 or the external server by being connected to the external apparatus 70 or the external server.

Further, as the presentation begins, the controller 180 operates a timer within it. The timer may operate so that a predetermined time set for the presentation decreases to "0" as time goes by. As a result of the matching in Step S503, if it is detected that the extent to which the content associated with the already-stored presentation is matched to the wearer's voice information input through the microphone 122 is at a reference value or above, the controller 180 detects the information on a portion of the content that follows a position in which a matched portion of the content is detected (S504).

Here, the reference value is a predetermined ratio value or a ratio value changed through the user input. For example, a specific portion of the content associated with the already-stored presentation is matched to the wearer's voice information by 90 percent or more, the corresponding position in which the matching is detected is determined to be the matched portion of the content.

In addition, if the already-stored content is made from multiple lines or multiple pages, the controller 180 predetermines a reference at which the matching begins. For example, the controller 180 determines a starting line of matching or a starting page of matching. The controller 180 determines that a page of the content corresponding to the image information projected onto the screen 80 is the starting page of matching. To do this, the display device 100 described in the present invention includes at least a camera 121 to obtain the image projected onto the screen 80.

In addition, the controller 180 adjusts the extent to which the following content information is detected, according to the input speed of the voice information input through the microphone 122. Further, the controller 180 detects only a pointer value corresponding to a position of the following content information and thus provides only the corresponding positional information to the wearer. In this instance, a waiting state is maintained until the user's input for outputting is applied.

In this manner, when detecting the following content information, the controller 180 displays at least a portion of the details corresponding to the following content information detected, to the display 151 (S505). Here, the details corresponding to the following content information refer to details that the wearer next presents according to the presentation order, that is, content details that are stored after the portion of the content associated with the already-stored presentation, which is matched to the wearer's voice information.

For example, the details corresponding to the following content information may be a script of the details of what to tell next or may be a page that follows the image currently displayed on the screen 80. In this manner, the content details ahead of the details of the presentation currently in progress is in advance provided to the presenter. This helps the presenter be prepared for what to tell next. As a result, the presentation proceeds smoothly.

Here, the display 151 is configured to be arranged so as to correspond to at least one among both eyes of the wearer of the main body. That is, the display 151 is arranged to correspond to the wearer's left eye or right eye, or to the wearer's both eyes.

In addition, the controller 180 outputs not only the following content information detected, but also the content information being presented and is present immediately before, to the display 151. In this instance, the controller 180 displays the content information corresponding to the voice information input through the microphone 122 and the following content information so as to visually distinguish between them.

For example, the scripts of the content associated with the presentation, which have primary colors, are output to the display 151. As the wearer proceeds with the presentation, an effect (hereinafter referred to as a "NORAEBANG subtitle effect") is output in which the scripts change in different colors (or in different shapes). To do this, the controller 180 updates the screen output to the display 151 and the screen change, in real time.

In addition, a method of displaying the details corresponding to the following content information to the display 151 is realized or modified in various ways. As one example, a content screen output to the display 151 may be of a type in which the content screen is viewable only to the wearer.

For example, the content screen may be of a type in which an augmented reality screen is displayed for the wearer. The augmented reality screen is realized so that the projector and a prism are connected to each other at a position adjacent to the camera 121 as illustrated in FIG. 3 and thus the visual information is transferred to the projector, then is transferred from the projector to the prism, and is spread from the prism directly to the wearer's eyeballs. In addition, the content screen may be of a type in which the visual information provided by the controller 180 is displayed only within the display 151 arranged in a manner that corresponds to at least one among the wearer's both eyes, resulting in the screen being displayed for the wearer.

As another example, the content screen output to the display 151 may be of a type in which the content screen is displayed for all viewers through the screen 80 or other objects (for example, a wall or a desk). To do this, in addition to the display 151, the display device 100 in FIG. 3 further includes a projection unit configured to include a light source element, an image formation module, and a lens. One or more projection units are provided in a position adjacent to the display 151.

Here, the light source element is an element that emits light. The image formation module is configured to form the video information (or the screen information) using light. The projection unit includes, particularly, a laser diode, as the light source element. The laser diode is made from, for example, a red laser diode.

In this instance, the controller 180 outputs the visual information currently output to the display 151, to the screen 80 and another object at the same time, using light (for example, visible light) emitted from the projection unit. Therefore, a disadvantage of a glasses-type display device 100, in which the display 151 is limited in size, as illustrated in FIG. 3, is overcome.

In addition, there is an advantage that a larger amount of the visual information than an amount of the video information projected onto the screen 80 can be provided to the attendants of the presentation. There is another advantage that the visual information is greater in variety than the video information projected onto the screen 80 can be provided to the attendants of the presentation.

As another example, the display 151 according to an embodiment of the present invention the display device 100 may be of a type in which the display 151 is not included and the screen information is not provided to the wearer as described above. In such a case, the details of the following content information detected by the controller 180 are output through the audio output module 152 integrally combined with the display device 100.

In addition, the controller 180 further outputs additional information relating to the following content information to the display 151, based on the output speed of the content information. Here, the additional information includes at least one among information on the wearer of the main body, time information calculated based on the input speed of the voice information and a remaining amount of content, information on an amount of the already-stored content, information indicating the extent to which the presentation proceeds, additional information relating to the following content information and information on the attendants of the presentation.

If the display 151 includes a first display and a second display that correspond to the wearer's left and right eyes, respectively, the controller 180 outputs the visual information (for example, the scripts of the content) corresponding to information on the wearer's voice to any one of the first display and the second display, and outputs the additional information relating to the following content information or a result of an additional search to the other.

For example, if the multiple display units 151 are provided so as to correspond to the wearer's left and right eyes, respectively, as illustrated in FIG. 6A, a script 611 being presented and scripts 613 of the content to be presented are output to a first display 610 in a visually differentiated manner (for example, the "NORAEBANG subtitle effect"). For example, when the wearer says "AAA," the NORAEBANG subtitle effect is output on the script "AAA" displayed on the display 151.

A control key 612 for scrolling through the scripts of the content is displayed on one region of the first display 610. Further, when a proximity touch by the wearer is applied to the control key 612, the scripts that are output to the first display 610 are scrolled through.

In addition, an image 622 the same as the image projected onto the screen 80 or the same in presentation progress as the image projected onto the screen 80 is output to a second display 620 in FIG. 6A. Additional information, such as a thumbnail image 623 indicating a position of the corresponding image 622 in the whole content or an indicator 625 indicating the extent of progress, is displayed on the second display 620 in FIG. 6A.

Further, the wearer moves the indicator 625 to a desired position in order to display a desired page on the display 151. In addition, an image 621 indicating the time information that depends on progress in the presentation is displayed on one region of the second display 620. The image 621 includes the information on the time (for example, 4 minutes and 30 seconds) assigned to the corresponding page and the information on the time (for example, 15 seconds) that elapses currently.

As another example, referring to FIG. 6B, a script 631 being presented and scripts 632 of the content to be presented are output to the first display 610 in a visually differentiated manner (for example, the NORAEBANG effect), and the scripts are automatically scrolled through according to the information on the wearer's voice input through the microphone 122 or is scrolled through along a direction of the wearer's stare recognized through the camera 121.

Then, the image 630, which is the same as the image projected onto the screen 80, or the same in presentation progress as the image projected onto the screen 80 is output to the second display 620, so as to have a multiple page-overlapping structure in which the image 630 appears in the front. The screen output in this manner is changed by control keys 640 displayed on one region of the second display 620.

Each of the multiple pages has the positional information and the assigned time information. Specifically, when the wearer applies the proximity touch to the control key indicating "next," as illustrated in FIG. 6B, a "page turning effect" is output and at the same time a page that follows the image 622 is displayed.

As another example, referring to FIG. 6C, the script 631 being presented and the scripts 632 of the content to be presented are output to the first display 610, in a visually differentiated manner (for example, the NORAEBANG subtitle effect), and the results of the additional search associated with the script 631 being presented are displayed on the second display 620.

To do this, the wearer performs the proximity touch on an "additional key 645" displayed on the second display 620. Then, a web search result 655 associated with a script keyword 661 currently being presented is displayed on the second display 620. If the number of the web search result is two or more, different keys 662*a* and 662*b* for executing a page turning function are output.

In addition, if the display 151 is one, the following content information and the additional information described above are displayed on the multiple regions, respectively, is displayed when the screen is changed according to a user operation, or is displayed in the form of a pop-up window, depending on presentation environment.

Further, if a tone of the wearer's voice input through the microphone 122 exceeds a reference range, that is, if the wearer's voice is in an excessively high or low tone, an indicator indicating a current tone of the wearer's voice is displayed on the display 151. For example, if the tone of the wearer's voice is higher than the reference range, the controller 180 outputs a red-colored arrow indicating the upward direction to the display 151 in order for the wearer to recognize his/her current voice tone, or the controller 180 outputs an arrow indicating the downward direction to the display 151 in order to provide the wearer with a guide for lowering his/her voice tone.

Conversely, if the tone of the wearer's voice is lower than the reference range, the controller 180 outputs a blue-colored arrow indicating the downward direction to the display 151 in order for the wearer to recognize his/her current voice tone, the controller 180 outputs an arrow indicating the upward direction to the display 151 in order to provide the wearer with a guide for making a presentation with his/her further raised voice tone.

In addition, if a presentation speed of the wearer that results from the voice input through the microphone 122 exceeds the reference value (that is, excessively fast) or is determined to exceed the time already assigned to the presentation (that is, excessively slow), the display device 100 displays an indicator corresponding to the current presentation speed (or a proper-speed guide indicator) on the display 151 in order to provide the wearer with a guide for speaking at a proper speed.

In addition, various example of the operation associated with different details that are output to the display 151, an output range, a user interface (UI), and a screen change are described in detail below. In this manner, the following content information is output to the display 151 (or the audio output module 153), the controller 180 adjusts the output speed of the content information so that the output speed of the content information corresponds to the input speed of the information on the wearer's voice input into the microphone 122 (S506).

Further, when the display device 100 described in the present invention is configured not to include the display 151, as described above, and thus not to provide the screen information to the wearer, the controller 180 converts the detected following content details into a voice signal, transfers the result of conversion to the audio output module 153, for example, the bone conduction presenter), and adjusts an output speed of the voice signal so that the output speed of the voice signal corresponds to the input speed of the voice information. For example, the controller 180 performs the control so that as the input speed of the voice information is faster, the output speed of the following content details that are output through the bone conduction presenter is faster.

The matching processing, the detection processing, and the outputting processing of the voice information, which are described above, repeat until the presentation is finished (S507). Further, when the connected projector 50 is changed to an off state, or when a predetermined user's input is applied to the display device 100, the controller 180 recognizes this as a termination of the presentation.

In addition, when the termination of the presentation is recognized in Step S507, the controller 180 outputs a predetermined alarm (for example, an alarm sound, a vibration, a guide message) that corresponds to the termination of the presentation.

As described above, the display device according to the embodiment of the present embodiments is mounted on the head of the presenter that make a presentation. Thus, the display device provides the related information in advance in order for the presenter to smoothly proceed with the presentation, and operates in accordance with the presentation speed of the presenter without performing a special operation. This provides the presenter with convenience.

Examples are described below in each of which according to various inputs applied to the display device 100 described in the present invention, the screen and/or the sound that are output to the display device 100 are controlled or the image projected onto the screen 80 is controlled.

[x] FIGS. 7A to 7H are diagrams illustrating examples in which the screen output to the display device, or the image projected onto the display device is controlled based on various signals input by the wearer, according to the embodiment of the present invention.

Here, as an example, the display device 100 includes the display 151 and the content associated with the already-stored presentation is made from the multiple pages. In addition, each of the following content information and the additional information (for example, the positional information on the content, the time information, the information on the additional result, and so forth) output to the display 151 is assumed to include an amount of the information larger than an amount of the image projected onto the screen 80.

In addition, the controller 180 determines an output range of the following content information to be displayed on the display 151, based on the time information already assigned to each of the multiple pages and on the information on a remaining amount of presentation time.

For example, when the time assigned to the corresponding page is almost consumed, the display 151 outputs the following page in advance. In addition, if the time assigned to the presentation is almost consumed, considering that the progress speed of the presentation becomes faster and faster, the display 151 outputs an amount of the content information, larger than a reference range, to the display 151.

Further, when the time already assigned to the corresponding page is longer compared to different pages, recognizing that the corresponding page contains an important explanation, the controller 151 outputs a larger amount of the content information to the display 151. Conversely, if the time already assigned to the corresponding page is shorter compared to the different pages, considering a likelihood that the corresponding page will be skipped because it is of less importance, the controller 151 outputs the following page in advance to the display 151. In this instance, the wearer gives an explanation, referring to only the image in the screen 80.

In addition, as illustrated in FIG. 3, in order to detect the various signals that are input by the wearer, the display device 100 includes at least one or more among the sensing unit 140 for detecting the living body information (a bio-signal), a first camera 121 for detecting the wearer's gesture, a second camera for tracking the wearer's stare, and a touch sensor provided in one point or one region of the frame 101 that maintains a form of the display device 100.

According to one embodiment, the controller 180 determines whether or not the wearer who makes a presentation is in a tense state, based on the living body information (bio-signal) of the wearer detected through the sensing unit 140. This determination is made by the external apparatus 70 connected to the display device 100.

Here, the bio-signal means an electric signal between human cells, for example, one among an electroencephalogram (EEG) signal, an electrocardiogram (ECG) signal, a photoplethymogram (PPG) signal, and a galvanic skin response (GSR) signal, but is not limited to these. The bio-signal includes various types of information that are widely used for measuring an emotional state in the related art, for example, a body temperature, a change in a staring direction, a change in the size of a pupil, the number of times of blinking and so forth.

When a pulse rate, or a breath rate detected through the sensing unit 140 is recognized as being increased, and/or when the body temperature is recognized as being increased to a reference value or above, the controller 180 determines that the wearer is in the tense state.

In addition, in order to determine whether the wearer is in the tense, the controller 180 sets the living body information, detected through the sensing unit 140, to be a first determination reference, and sets different detection information, such as a voice tone or a voice trembling of the wearer, or the number of times that the wearer swallows his/her saliva, to be a second determination reference.

When in this manner, the wearer is determined to be in the tense state, the controller 180 outputs changes the sizes of character size or the size of an image that corresponds to the following content information output to the display 151, or outputs a highlighting effect.

Figure 7A:
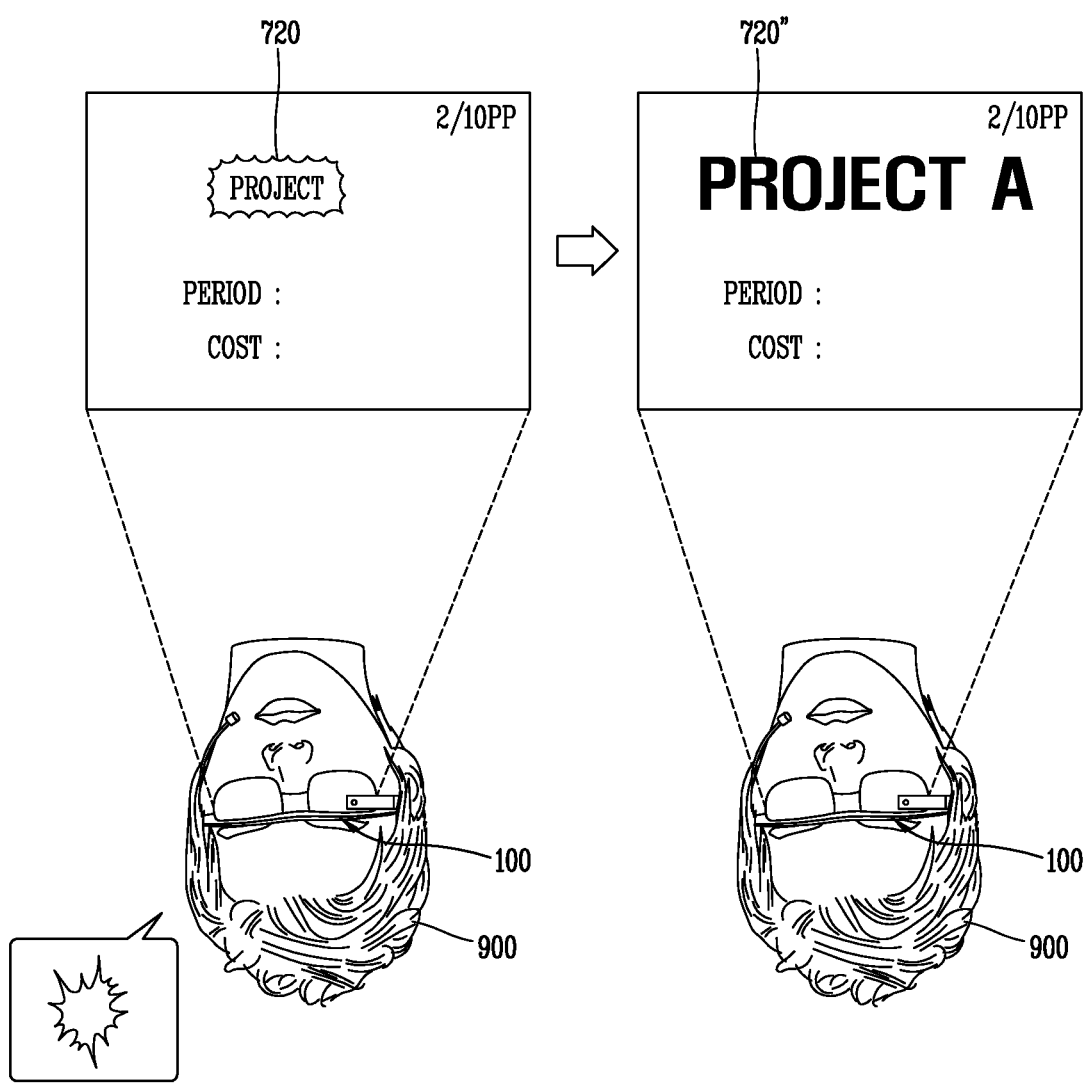

Specifically, if the wearer is determined to be in the tense state when the following content details are output to the display 151 as illustrated in FIG. 7A, the sizes of characters 720 "Project A" are changed and thus are output as boldfaced characters 720" to help the wearer easily recognize the script that he/she should read for the presentation. Along with this, the highlighting effect of causing blinking is output to the characters 720" to draw attention of the wearer. In addition, the controller 180 outputs the characters 720 to be next presented, to the audio output module 153, for example, the bone conduction presenter.

In addition, this process may be performed in phases according to the extent to which the wearer is tense. In addition, along with this, the controller 180 outputs the content screen or the sound already registered with the image display device 100 in order alleviate the tense state of wearer. Further, according to one embodiment, the controller 180 performs the control so that a display change occurs in the following content information output to the display 151, based on the gesture input by the wearer.

To do this, in the display device 100, the touch sensor that detects the touch input is provided in at least a region of the main body frame, and the first camera 121 for detecting the gesture input by the wearer is provided in the outside surface of the main body. That is, the first camera 121 is used for detecting the gesture input by the wearer.

From the conceptual point of view, the gesture input conceptually includes an input that uses a motion gesture, such as movements of the wearer's hand, an adjacent object, and the like, an input that uses recognition of the shape or size of the hand or the adjacent object, and an input that uses a hand gesture, such as a specific movement of the hand.

Referring to FIGS. 7B to 7H, specific examples are described below in each of which the video information output to the display 151 or the screen 80 with various gesture inputs by the wearer is controlled using the first camera 121 and the touch sensor.

Figure 7B:
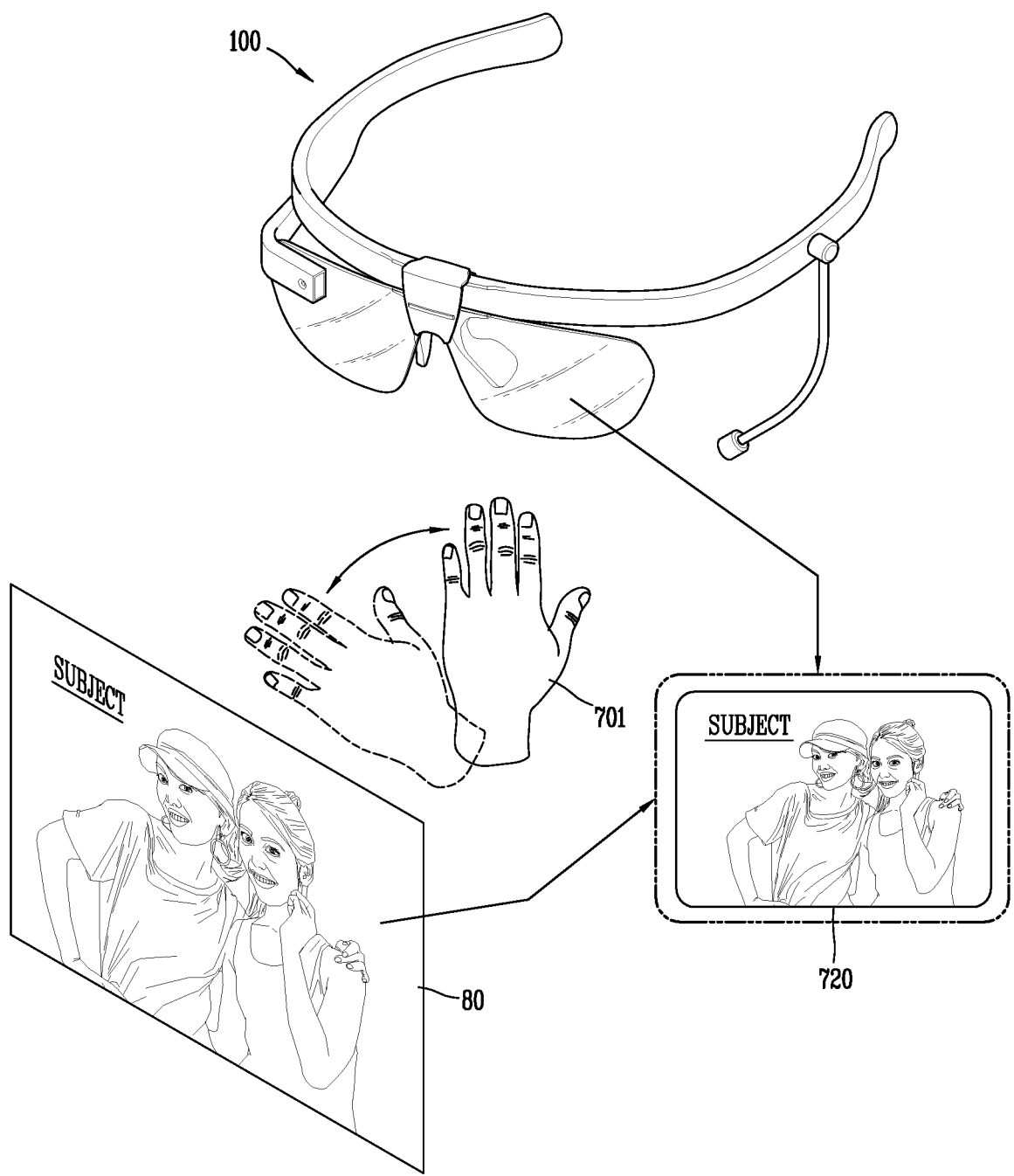

According to a first embodiment, as illustrated in FIG. 7B, when the gesture input is applied in which the wearer shakes or waves his/her hand 701 of the wearer positioned between the main body and the screen a predetermined number of times when the display device 100 and the screen 80 on which to project the image of presentation faces each other, in response to this, the controller 180 performs the control so that an image 720 currently projected onto the display 151 is projected onto the screen 80 as well.

Further, when a sound corresponding to the image projected onto the screen 80 is output, this sound also is changed to a sound that corresponds to the image output to the display 151. In this manner, the case where the image output to the screen 80 and the image output to the display 151 are of the same is limited to only if the gesture input described above is applied.

As time goes by, a different image (that is, the following content information and the additional information) from the image output to the screen 80 is output back to the display 151. In addition, when a predetermined control signal is transmitted to the projector 50 connected to the display device 100, the screen output to the screen 80 returns to the previous screen.

According to a second embodiment, as illustrated in FIGS. 7C and 7D, when the gesture input that rotates multiple touch starting points applied to a border region of the display 151 is applied in a predetermined direction, the controller 180 magnifies or reduces the following content information displayed in the display 151 in a navigating manner.

Specifically, referring to FIG. 7C, when the multiple touch starting points (for example, an operation in which the wearer grasps the frame of the display with his/her thumb or forefinger (and the other fingers)) applied to the border region (for example, the frame) of the display 151 are rotated in a first direction, for example, clockwise, the controller 180 magnifies the following content information displayed on the display 151 in a navigating manner.

Accordingly, a screen 735 of which the size is increased with the center of a previous screen 730 as the center of the screen 735 is output to the display 151. In this instance, the wearer applies the proximity touch to the previous screen 730 or the size-increased screen 735, and thus a different portion of the screen is moved or rotated to be positioned in the center. In addition, the size-enlarged screen 735 includes further detailed information according to a type of the content (for example, a map).

Specifically, referring to FIG. 7D, when the multiple touch starting points (for example, the operation in which the wearer grasps the frame of the display with his/her thumb or forefinger (and the other fingers)) applied to the border region (for example, the frame) of the display 151 are rotated in a second direction, for example, counterclockwise, the controller 180 reduces the following content information displayed on the display 151 in a navigating manner.

Accordingly, the screen 735 of which the size is reduced with the center of the previous screen 730 as the center of the screen 735 is output to the display 151. In this instance, the size-reduced screen 735 is smaller in size than the previous screen, but the output range of the content is further broadened.

In addition, according to a third embodiment, referring to FIG. 7E, when an input that drags a touch applied to one region of the frame 101 of the display device 100 in the first direction, for example, in an inward direction C that faces toward the wearer is applied, the controller 180 scrolls through script lines of the following content information displayed on the display 151 in the first direction, that is, so that the script lines are displayed.

Further, referring to FIG. 7F, when an input that drags a touch applied to one region of the frame 101 of the display device 100 in the second direction, for example, in an outward direction D opposite to the inward direction C, is applied, the controller 180 scrolls through the script lines of the following content information in the second direction, that is, so that the previous script lines are displayed.

In addition, according to a fourth embodiment, referring to FIG. 7G, based on the touch input that taps on a first region (for example, a right-side region) of the frame 101 of the display device 100 a predetermined number of times (for example, two times), the controller 180 turns over a document page corresponding to the following content information display on the display 151 in the first direction (for example, in the direction of the following page).

Further, referring to FIG. 7H, based on the touch input that taps on a second region (for example, a left-side region) of the frame 101 of the display device 100 a predetermined number of times (for example, two times), the controller 180 turns over the document page corresponding to the following content information displayed on the display 151 in the second direction (for example, in the direction of the previous page).

In addition, according to a fifth embodiment, when the touch input that taps on the first region or the second region of the frame 101 of the display device 100 three times or more, or when a long touch input is performed on the first region or the second region, the turning-over of the page accelerates. That is, an effect of turning over the multiple pages is output in the direction corresponding to the corresponding region. When a short touch input is applied in this state, the page stops being turned over and the page at a stopping point is output to the display 151.

Figure 8A:
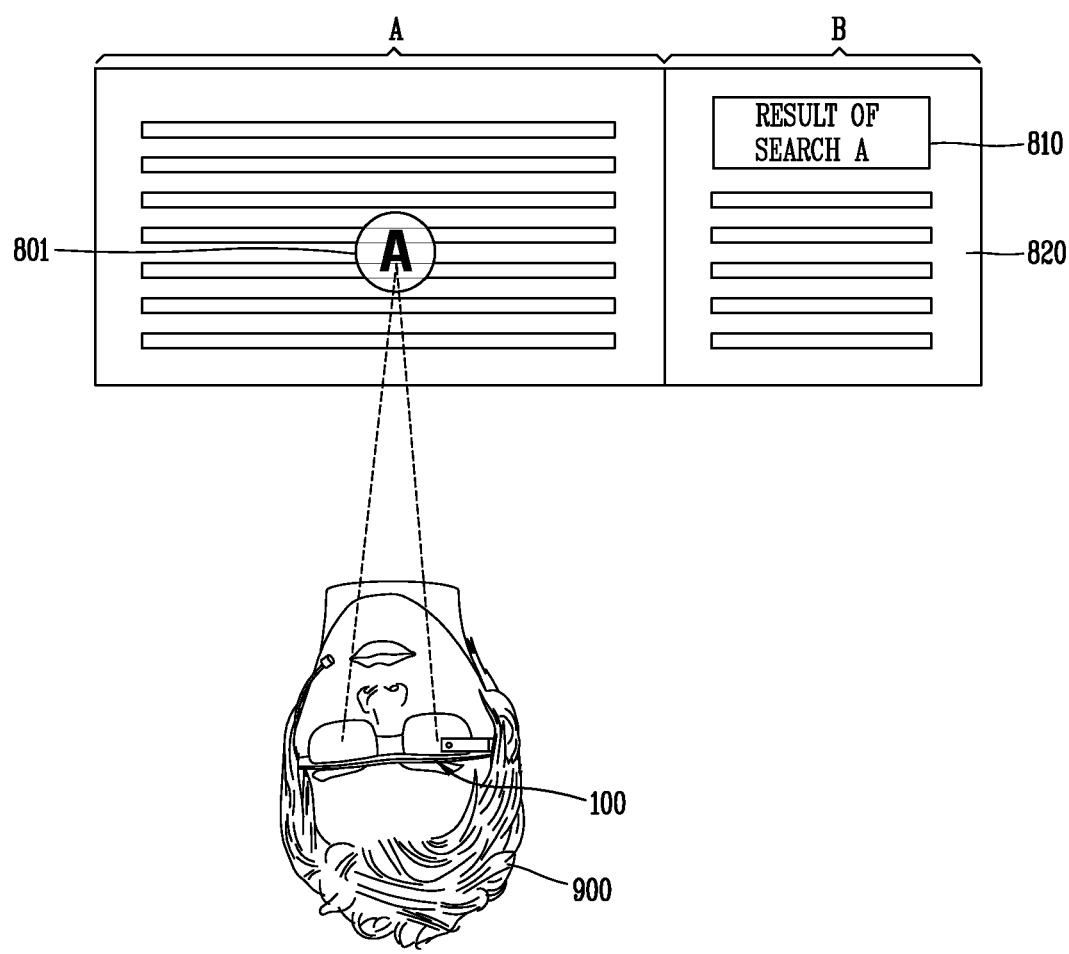
FIGS. 8A to 8B are diagrams illustrating examples in which the screen output to the display device is controlled based on a wearer's stare according to the embodiment of the present invention.
Figure 8B:
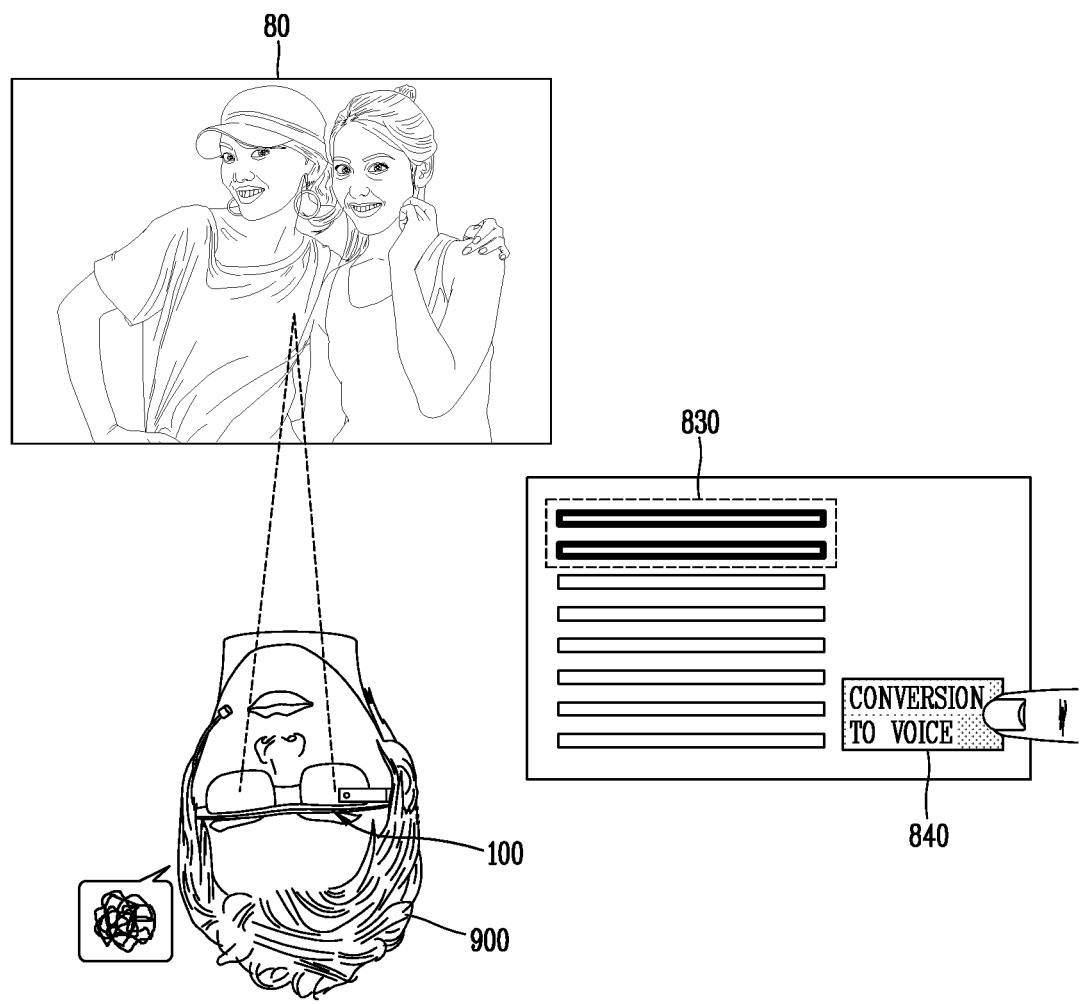

Referring to FIGS. 8A and 8B, examples are described below in each of which the screen output to the display device is controlled based on the wearer's stare. To do this, the display device 100 may further include the second camera for tracking the wearer's stare, which is connected to the inside of the main body. The second camera moves or rotates corresponding to a movement of the eyeball of the wearer.

That is, the second camera is used to track the wearer's stare. Eye tracking refers to a technology in which the wearer's stare is tracked by recognizing the pupil of the wearer from the image input through the camera. The eye tracking has an application in sports broadcasting, a system for the disabled, recognition of a customer's traffic line and recognition of a customer's stare. In recent years, research has been conducted on various algorithms for interfaces for the eye tracking.

When the wearer's stare is fixed to a specific object, which is output to the display 151, for a predetermined time when the following content information is output to the display 151, the controller 180 outputs the result of the additional search associated with the specific object to one region of the display 151.

For example, if the wearer of the display device 100, as illustrated in FIG. 8A, stares at an "A" object 801 output to the display 151, for two seconds, web search results 810 and 820 associated with the "A" object 801 are displayed on different regions of the display 151. In addition, the wearer of the display device 100 is recognized as staring at a specific object output to the screen 80, the web search result associated with the corresponding object is output.

Further, if the input by the wearer of the voice information into the microphone 122 is not applied and the wearer's stare is fixed to the screen for a predetermined time when the following content information is output to the display 151, the controller 180 recognizes that the wearer forgets what to present next, or that the wearer is in the tense state.

In this instance, the controller 180 performs the control so that the highlighting effect is output on the script of the following content information output to the display 151 or that the following content information is converted into the voice signal and thus is output. For example, when a wearer 900, as illustrated in FIG. 8B, stares at the screen 80 for a predetermined time (for example, five seconds or more) without saying any words during the presentation in progress, the highlighting effect (for example, blinking, color changing, box marking and the like) is output on some of the scripts that are read in the screen output to the display 151 of the display device 100.

Then, along with this, an icon 840 for outputting the content information to be next presented, as a voice, is displayed on one region of the display 151. When the wearer applies the proximity touch to the corresponding icon 840, the content information to be next presented is output as the wearer's already-recorded voice, Referring to FIGS. 9A and 9B, examples are described below in each of which the screen output to the display device is controlled based on the wearer's voice command. When a predetermined voice command is applied through the microphone 122 when the following content information and the additional information are output to the display 151, the controller 180 controls the display 151 so that the display change that corresponds to the voice command input is displayed.

Further, the predetermined voice command is a command already registered with the display device 100. For example, when a voice (for example, "page five," "first page") referring to a specific page, or a voice (for example, "next page") referring to the moving direction of the page currently output, an operation corresponding to the corresponding voice command is performed.

For example, as illustrated in FIG. 9A, when the wearer says "next" when the screen corresponding to the following content information is output to the display 151, the controller 180 recognizes this as a control command for displaying the following page. Accordingly, a screen 901 of a page 3 is changed to a screen 903 of a page 4.

In addition, for example, as illustrated in FIG. 9B, the wearer says "beginning" when a screen 903 of a page 9 corresponding to the following content information is output to the display 151, the controller 180 recognizes this a control command for displaying the beginning page of the presentation. Accordingly, a screen 903 of a page 9 is changed to a screen 904 of a page 1 in the display 151. In addition, the screen changes corresponding to those as illustrated in FIGS. 9A and 9B are performed on the screen 80 at the same time.

In addition, the controller 180 is set so as to operate in response to only the wearer's voice command. To do this, the controller 180 compares the voice command, input through the microphone 122, with the already-recorded wearer's voice to determine whether or not there is consistency between them.

Further, occasionally during the progress in the presentation, the wearer spends a lot of time talking about a subject that does not relate directly to the presentation. In this instance, the display device 100 needs to guide the wearer to talking about a subject that relates to the presentation.

To do this, if the voice information input through the microphone 122 remains unmatched to the already-stored content details for a predetermined time or more, the controller 180 outputs a predetermined alarm. Further, the predetermined alarm includes at least one or more among a sound, a message, a vibration, and a highlighting effect for the following content information (a highlighting effect for an image representing the time information).

As the voice information is unmatched to the details of the already-stored content remains for a longer time, strength of the alarm is greater. In addition, the screen change in the display 151 and/or the screen 80, described above, is performed with the successive multiple inputs by the wearer.

For example, if the image projected onto the screen 80 is to be changed without having to operate the projector 50, the touch gesture, the stare change, or the like is performed on the image display device 100 for moving to the page corresponding to the desired content information, and then the screen output to the display 151 through the gesture input illustrated in FIG. 7B is provided to the screen 80.

Examples are described below in each of which the display device 100 described in the present invention is connected to the external apparatus 70 that provides the video information to the projector 50 or is connected to a different display device 100 in order to control the screen output to the display 151 or to control the operation of the display device 100.

Figure 10A:
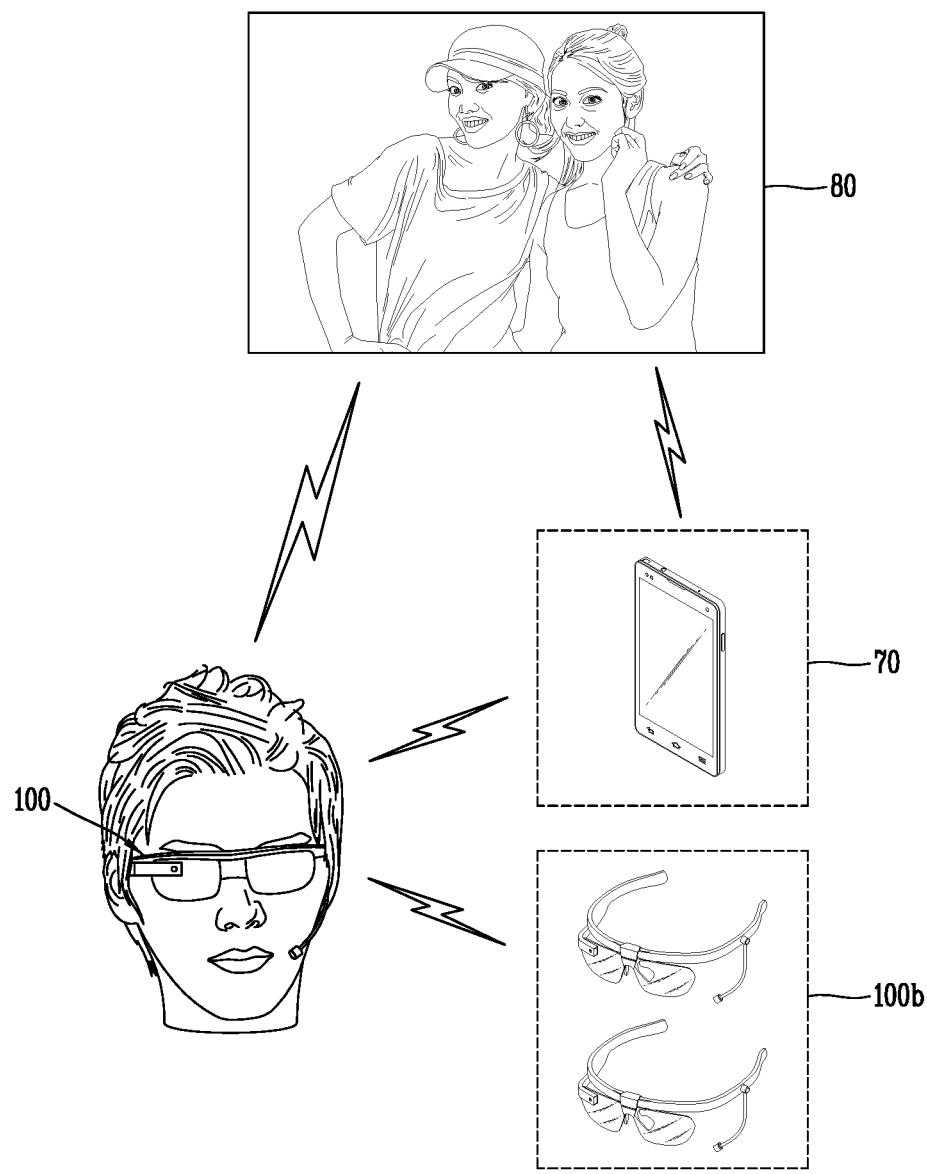
FIGS. 10A to 10C are diagrams illustrating an example in which the display device according to the embodiment of the present invention is connected to an external apparatus to receive a question and conducts a search for the purpose of preparing for an answer to the question.
Figure 10B:
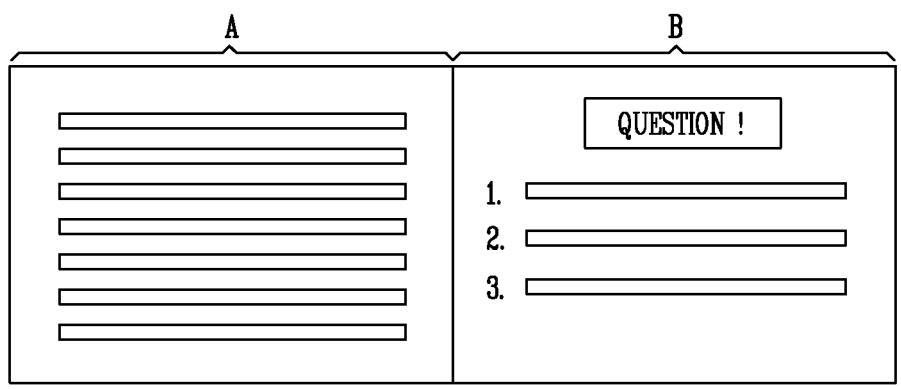
Figure 10C:
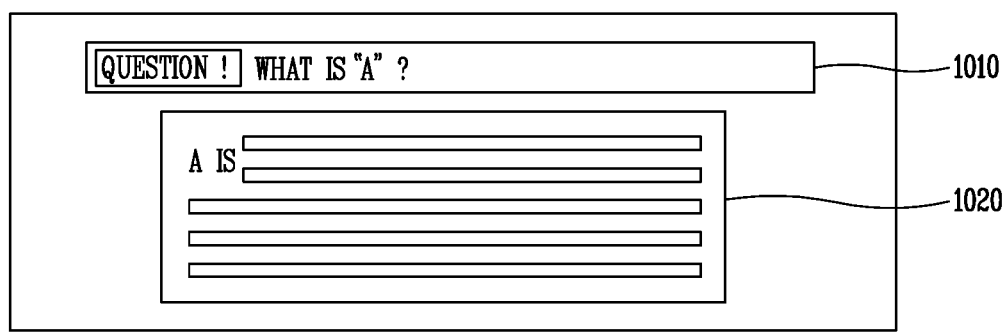

In the examples illustrated in FIGS. 10A to 10C, the display device 100 according to the embodiment of the present invention is connected to the external apparatus 70 or the different display device 100 in order to receive questions associated with the presentation and conduct a search for the purpose of preparing for answering the questions.

In addition, a wireless or cable connection is made between the display device 100 and the external apparatus 70 and between an external apparatus 170 and the projector 50, for example, using a short-range communication standard, a wireless Internet standard such as Wi-Fi, or an external-apparatus interface standard such as a universal serial bus (USB).

In addition, if the connection is made between the display device 100 and the external apparatus 70, the display device 100 outputs the screen information, the same as the image to be projected onto the screen 80 through the projector 50, or outputs the screen information including the information more detailed than the screen-projected image. To do so, the display device 100 receives the data relating to the corresponding screen information from the external apparatus 70.

To do this, the display device 100 further includes a wireless communication unit for receiving a wireless signal corresponding to the information relating to the presentation described above, which is connected to the external apparatus 70 or the different display device.

When the wireless signal is received from the external apparatus 70 or the different display device connected, the controller 180 converts the wireless signal into characters and the characters that results from the conversion are displayed on one region of the display 151. In addition, the controller 180 stores the characters that results from the conversion, in the document file format in which the characters are transmittable to the outside.

In addition, the display device 100 described in the present invention can transmit at least an item of data to the external apparatus 70 or the different display device connected through the wireless communication unit .

In this instance, the controller 180 searches for the content details associated with the already-stored presentation using the characters that result from the conversion, as keywords. The data corresponding to the result of the search is displayed on the display 151 or is transmitted to the connected external apparatus 70 and thus the feedback can be performed on the data.

For example, as illustrated in FIG. 10A, the display device 100 receives the video information from the connected external apparatus 70 and provides or outputs the received video information to the screen 80 or to the display 151. In addition, as illustrated in FIG. 10A, the display device 100 worn by the presenter a display device 100*b* worn by the listener who listens to the presentation are connected to each other for interaction between them.

In this instance, as illustrated in FIG. 10B, when a question input into the display device 100*b* worn by the listener is received by the display device 100 of the wearer, questions corresponding to a script A corresponding to the following content information are output to one region B of the display 151. Order in which the questions are displayed corresponds to the time when the question arrives from the display device 100*b* worn by the listener. In addition, although the screens that are output to the display device 100*b* worn by the listener and the display device 100 by the wearer are different from each other, the characters corresponding to the question are displayed on a script position corresponding to a page into which the listener inputs the question.

FIG. 10C illustrated a response screen that the display device 100 transmits to the display device 100*b* worn by the listener. The display device 100 searches for the content details (which can include more-detailed additional information) associated with the already-stored presentation using the characters corresponding to the question as the search key words. Results 1010 and 1020 of the search are transmitted to the display device of the listener who transmits the question, and thus the answer to the question is provided without interrupting the presentation in progress. When the answer is not satisfactory, the listener can transmit another question to the display device 100.

In addition, the display device 100 described in the present invention collects information relating to the extent to which the listeners understand the presentation, through the cameras provided in the display devices worn by the listeners and displays the portion of the presentation, whose a understandability level is below a reference value, on the display 151.

Figure 11:
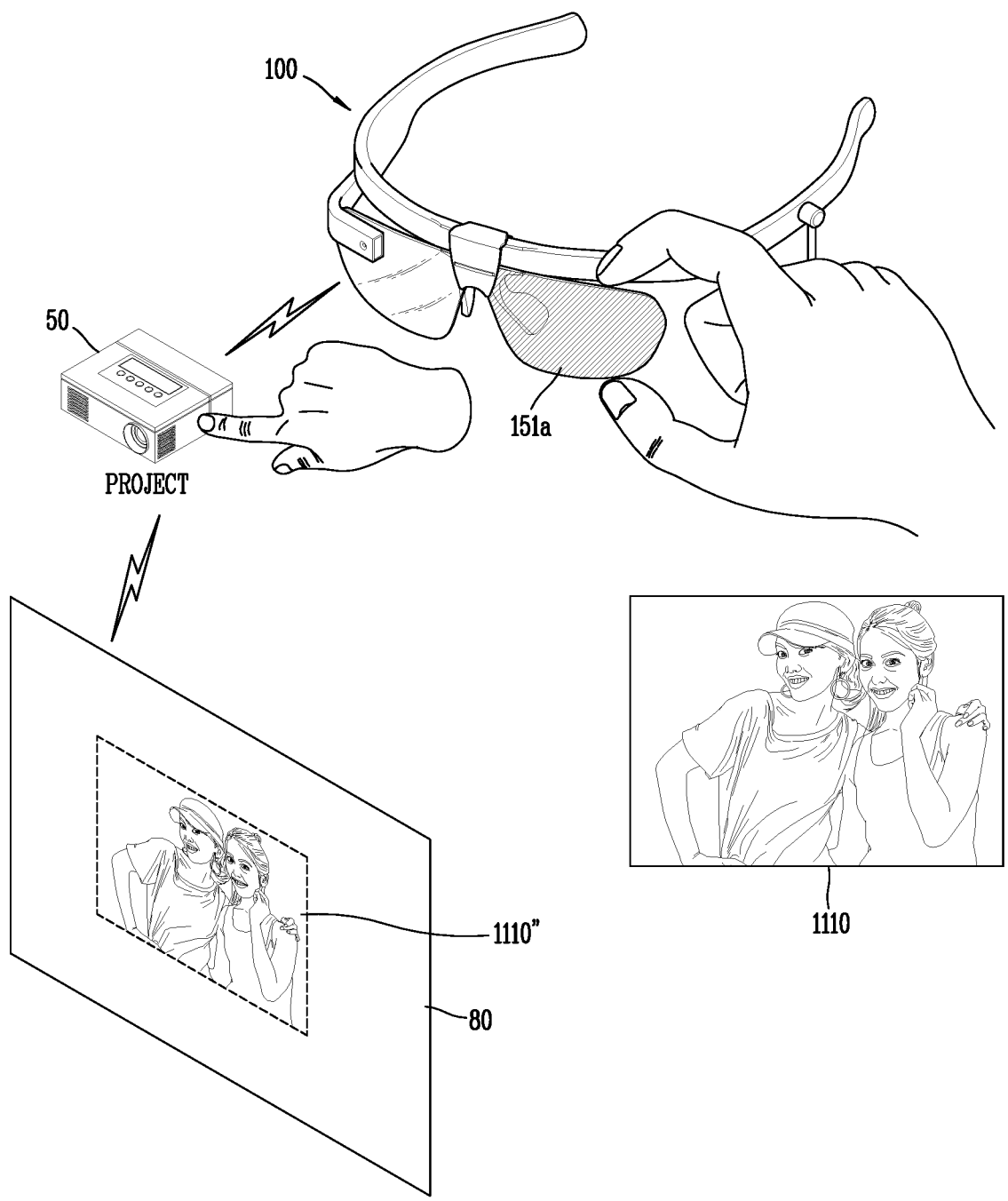
FIG. 11 is a diagram illustrating the fact that the display device according to the embodiment of the present invention provides information relating to the presentation to the wearer and at the same time, provides video information to be projected, to a projector.

Next, FIG. 11 is a diagram illustrating the display device 100 provides the information relating to the presentation to the wearer and at the same time, provides the video information to be projected, to the projector 50. Here, the example in which the display units (that is, the first display and the second display) of the display device 100 are provided for the wearer's left and right eyes, respectively, is described above, but the present invention is not limited to the example described above.

In addition, the display device 100 can transmit and receives a predetermined wireless signal to and from the projector 50. When the following content information and the additional information that are described above are output to the display 151 of the display device 100, the controller 180 detects a predetermined gesture input for transmitting the already-stored content associated with the presentation to the projector 50.

As illustrated in FIG. 11, such a gesture is, for example, a gesture input in which the finger points to the projector 50 when the multiple points of the frame of the display 151 are touched on. When such a gesture input is detected, the controller 180 controls the projector 50 so that the screen displayed on the display 151 is output to the screen 80 at the same time. Specifically, as illustrated in FIG. 11, when the gesture input in which the finger points to the projector 50 when the multiple points of the frame of the second display (the left-side display) are touched on, a screen 1110 output to the second display is projected onto the screen 80 through the projector 50.

Conversely, when the gesture input in which the finger points to the projector 50 when the wearer touches on the multiple points of the frame of the first display (the right-side display), the screen output to the first display is displayed on the screen 80 through the projector 50.

If the same image is output to the display 151 and the screen 80 in this manner, when the screen output to the display 151 is changed until before a different gesture input by the wearer (for example, a gesture input that draws a shape "X" facing the projector 50) is detected, the screen output to the screen 80 is accordingly changed.

As described above, in the display device according to the embodiment of the present invention, and the method of controlling the display device, the related information is provided so that the presenter of the presentation proceeds with the presentation smoothly, with the display device being mounted on the head or other portions of the wearer. This provides the presenter with convenience because a user operation for controlling is simple. In addition, although an event happens unexpectedly, such as when the presenter is in the tense state, or when the presenter forgets the details of the presentation, the related information is provided so that the presentation proceeds without any interruption. This helps the presenter proceed with the presentation in a convenient manner.

In addition, the information relating to the presentation, transferred from the different external apparatus is provided in the form recognizable to the presenter, or the feedback on the information is generated and is transferred to the external apparatus, the interaction is immediately and quickly between the presenter of the presentation and the listener.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A wearable electronic device, comprising:
    a wireless communication unit configured to be wirelessly connected to a projector for projecting a stored presentation onto a screen of an external device;
    a main body configured to be worn by a user;
    a microphone integrally connected to the main body;
    a sensing unit configured to detect a bio state of the user wearing the electronic device;
    a display unit configured to be attached to the main body; and
    a controller configured to:
    match a voice information input through the microphone with a portion of the stored presentation, and
    display a part of the stored presentation that follows the portion of the stored presentation matching the voice information input on the display unit, wherein the controller is further configured to change an output size of the part of the stored presentation that follows the portion of the stored presentation or highlight the part of the stored presentation that follows the portion of the stored presentation when the bio state indicates the user to be in a tense state.

2. The electronic device of claim 1, wherein the controller is further configured to:
    convert the voice information into text, and
    search the stored presentation for the converted text so as to match the voice information with the portion of the stored presentation.

3. The electronic device of claim 2, wherein the controller is further configured to:
    display the converted text on the display unit with a different highlighting effect to distinguish the displayed converted text from the part of the stored presentation that follows the portion of the stored presentation.

4. The electronic device of claim 1, wherein the display unit includes first and second display regions for first and second eyes of the user.

5. The electronic device of claim 4, wherein the controller is further configured to:
    display, on the first display region, the part of the stored presentation, and
    display, on the second display region, at least a portion of a same image as an image of the presentation projected onto the screen.

6. The electronic device of claim 5, wherein the controller is further configured to display a progress indicator on the second display region indicating a progress state of the presentation based on the image projected onto the screen.

7. The electronic device of claim 5, wherein the presentation is stored in multiple pages of content, and
    wherein the controller is further configured to:
    display, on the second display region, the multiple pages of content as overlapping and with a page currently being projected on the screen of the external device being displayed first among the multiple pages.

8. The electronic device of claim 7, wherein the controller is further configured to display a page option on the display unit that can be touched or proximity touched to turn pages of the multiple pages.

9. The electronic device of claim 4, wherein the controller is further configured to:
    display the portion of the stored presentation on the first display region,
    search for additional information about the displayed portion of the stored presentation, and
    display the additional information on the second display region.

10. The electronic device of claim 1, wherein the controller is further configured to:
    convert the part of the stored presentation into a voice signal,
    output the voice signal to an ear of the user, and
    adjust an output speed of the voice signal to correspond to an input speed of the voice information.

11. The electronic device of claim 1,
    wherein the controller is further configured to highlight the part of the stored presentation when the detected bio state indicates the user is in the tense state.

12. The electronic device of claim 1, further comprising:
    at least one camera on the main body and configured to detect a gesture input by the user.

13. The electronic device of claim 12, wherein the controller is further configured to project an image output to the display unit onto the screen of the external device, when the detected gesture input includes the user waving their hand between the main body and the screen when the main body and the screen face each other.

14. The electronic device of claim 12, wherein the controller is further configured to magnify the part of the stored presentation displayed on the display unit when the detected gesture input includes a rotating hand gesture in a first direction, and reduce the part of the stored presentation displayed on the display unit when the detected gesture input includes a rotating hand gesture in a second direction opposite to the first direction.

15. The electronic device of claim 12, wherein the controller is further configured to scroll through lines of the part of the stored presentation displayed on the display unit in a direction corresponding to a direction of a touch and drag applied to a region of the main body including a touch sensor.

16. The electronic device of claim 12, wherein the controller is further configured to forward page through pages of the part of the stored presentation based on a tapping touch input on a first region of the main body, and reverse page through pages of the part of the stored presentation based on a tapping touch input on a second region of the main body.

17. The electronic device of claim 4, further comprising:
at least one camera on the main body and configured to track an eye movement of the user,
wherein when the detected eye movement is fixed to a specific object output to the first display region, the controller is further configured to perform a search associated with the specific object and display results of the search on the second display region.

18. The electronic device of claim 1, wherein the controller is further configured to match the voice information input through the microphone with preset voice commands, and when the voice information matches a preset voice command, execute the preset voice command.

19. The electronic device of claim 1, wherein the wireless communication unit is further configured to receive a wireless signal corresponding to information relating to the presentation from an external apparatus, and
wherein the controller is further configured to convert the wireless signal into characters, and display the characters on a region of the display unit or store the characters in a document file format in which the characters are externally transmittable.

20. A method of controlling a wearable electronic device including a main body configured to be worn by a user, the method comprising:
wirelessly connecting, via a wireless communication unit, to a projector for projecting a stored presentation onto a screen of an external device;
matching, via a controller, a voice information input through a microphone integrally connected with the main body with a portion of the stored presentation; and
displaying, via a display unit, a part of the stored presentation that follows the portion of the stored presentation which matches the voice information input on the display unit,
wherein the method further comprises changing an output size of the part of the stored presentation that follows the portion of the stored presentation or highlighting the part of the stored presentation that follows the portion of the stored presentation when the bio date indicates the user to be in a tense state.

\* \* \* \* \*